(12) United States Patent
Aaron et al.

(10) Patent No.: US 8,180,385 B2
(45) Date of Patent: May 15, 2012

(54) INTELLIGENT ADAPTIVE RE-CODING FOR IMPROVED COMMUNICATIONS RESOURCE UTILIZATION

(75) Inventors: Jeffrey A. Aaron, Atlanta, GA (US); Cheng P. Liu, Duluth, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 432 days.

(21) Appl. No.: 12/494,551

(22) Filed: Jun. 30, 2009

(65) Prior Publication Data
US 2010/0248643 A1 Sep. 30, 2010

Related U.S. Application Data

(63) Continuation-in-part of application No. 12/415,424, filed on Mar. 31, 2009, now Pat. No. 8,064,938.

(51) Int. Cl.
*H04B 7/00* (2006.01)
(52) U.S. Cl. ...... 455/509; 455/450; 455/452.2; 370/329
(58) Field of Classification Search ......... 455/452.2, 455/561, 522; 370/329, 338, 458, 400, 223, 370/276
See application file for complete search history.

(56) References Cited

U.S. PATENT DOCUMENTS

| | | | |
|---|---|---|---|
| 7,277,443 B2* | 10/2007 | Goode et al. | 370/400 |
| 2005/0227698 A1* | 10/2005 | Nonin et al. | 455/452.2 |
| 2007/0230395 A1* | 10/2007 | Guo et al. | 370/329 |
| 2008/0192710 A1* | 8/2008 | Balachandran et al. | 370/338 |
| 2009/0082059 A1* | 3/2009 | Terry et al. | 455/522 |

* cited by examiner

*Primary Examiner* — Lana N Le
*Assistant Examiner* — Golam Sorowar
(74) *Attorney, Agent, or Firm* — Turocy & Watson, LLP

(57) ABSTRACT

System(s) and method(s) that, periodically or when dynamically triggered, adapt data rates associated with user equipment (UE) in a network are presented. When the UE uses an application or a service, data traffic associated with the UE is inspected to obtain information relating to the application or service, which is used to determine an application/service margin. Current and historical information relating to communication conditions associated with the UE and an associated user is obtained to facilitate determining expected values of Quality-of-Service factors and communication condition metrics associated with the UE and thereby a volatility margin. For each adaptation time interval, the data rate can be adapted by determining a preliminary data rate and adjusting the preliminary data rate using the application/service margin and volatility margin to obtain the adapted data rate to be used for data communications between a node and the UE in the network.

26 Claims, 14 Drawing Sheets

US 8,180,385 B2

INTELLIGENT ADAPTIVE RE-CODING FOR IMPROVED COMMUNICATIONS RESOURCE UTILIZATION

CROSS-REFERENCE TO RELATED APPLICATION AND CLAIM FOR PRIORITY

This application is a continuation-in-part of and claims the benefit of U.S. Pat. No. 8,064,938 issued on Nov. 22, 2011, based on U.S. patent application Ser. No. 12/415,124, filed on Mar. 31, 2009, entitled "Adaptive Multi-Tiered Re-Coding For Improved Communications Resource Utilization", the entirety of which is incorporated herein by reference.

TECHNICAL FIELD

The subject innovation generally relates to wireless communications, and, more particularly, to employing adaptive re-coding for improved communications resource utilization.

BACKGROUND

In a wireless network (e.g., mobile core network), a typical Quality of Service (QoS) approach is to provide "best effort" when servicing applications. However, as applications or services utilized in the wireless network become more prevalent and more data intensive (e.g., video, multimedia), providing QoS for these applications or services can become more challenging. Further, a QoS of "best effort" is not desirable and/or is insufficient for many new applications or services. Traditional QoS approaches are not sufficient due to, for instance, large uncontrollable variations in radio frequency (RF) link conditions (and resulting available bandwidth) in the communication network (e.g., wireless communication network).

Conventionally, rate adaptation (e.g., adaptation of a coding rate, which translates to a corresponding bandwidth) is used to provide decent QoS with efficient resource utilization for voice calls in wireless systems (e.g., cellular systems). However, rate adaptation based on network conditions is generally not used for video or other applications or services, which are highly sensitive to QoS conditions such as delay/latency, jitter, packet loss, etc. Further, conventional rate adaptation techniques do not take into account the different types of applications or services being used in the network, where the applications or services can have different QoS needs and characteristics. Conventional rate adaptation techniques also do not take into account expected values of network conditions (e.g., QoS factors, RF link conditions) or desired data rates for a communication device. It is desirable to adapt data rates of communication devices in response to respective applications and services (and respective modes of operation) employed by the communication devices. It also is desirable to efficiently adapt data rates of communication devices in response to changing network conditions or expected changes in network conditions in a communication network.

SUMMARY

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject innovation provides a system(s), device(s), and method(s) that, periodically or when triggered, adapt respective data rates (or correspondingly rate coding) in a communication network (e.g., wireless communication network) are presented. In an embodiment, the communication network can comprise a wireless portion wherein wireless communications devices (e.g., mobile phones, personal digital assistants (PDAs), computers, gaming consoles, etc.) can be connected to the network and can communicate wirelessly with other communication devices (e.g., wired communication devices, wireless communication devices) in the network. The communication network also can include a wire-line portion associated with the wireless portion, wherein, in the wire-line portion, various communication devices (e.g., computers, servers, phones, or any data source that can provide content, such as video content, audio content, textual content, multimedia content, etc.) can be connected via a wired connection to the network and can communicate with other communication devices (e.g., wireless communication devices in the wireless portion, other communication devices in the wire-line portion) in the network.

In an aspect, the communication network can comprise an intelligent adaptation controller that can adapt data rates of a communication device based at least in part on type and/or current mode of application or service used by the communication device, and/or expected values of QoS factors and RF condition metrics associated with the communication device. When a communication device desires to utilize an application or service (e.g., to obtain information from a data source), the intelligent adaptation controller can determine an initial data rate (and corresponding rate coding) (e.g., a preliminary data rate, R), based at least in part on communication conditions (e.g., RF conditions) associated with the communication device, where the initial or preliminary data rate can be used as a basis for determining the desired data rate to be used to communicate information between the data source and communication device. For example, during the initial time interval after the application or service is initialized and set up, the data rate associated with the communication device can be set to the initial data rate, and the output data rate of an intelligent adaptation node (e.g., comprising a variable rate codec) associated with a base station serving the communication device can be set to the initial data rate and an input data rate (e.g., of a decoder component associated with a variable rate codec) of the communication device can be set to the initial data rate.

The intelligent adaptation controller also can set a timer to a predefined reset value (e.g., 0), where the timer can increment (e.g., or decrement, as desired) until a predefined adaptation threshold value is reached, wherein, when the predefined adaptation threshold value is reached, the timer can be reset to the predefined reset value and the data rate to be used for the communication device can be adapted for the next time interval. In another aspect, the predefined adaptation threshold (and thus, the time interval for adaptation) can vary from time interval to time interval based at least in part on the predefined rate adaptation criteria and current volatility of the communication conditions associated with the communication device.

During the current time interval, the intelligent adaptation controller can obtain information that can be utilized to facilitate determining the data rate to be employed with the communication device for the next time interval. The information can comprise, for example, type of application or service, specific application or service being used, current mode of operation (e.g., idle or sleep mode, active mode, textual mode, audio mode, video mode, multimedia mode, etc.) of the application or service, relevant Quality of Service (QoS)/Quality of end-user Experience (QoE) information, application or service needs and/or limits (e.g., thresholds), and predefined rate adaptation criteria (e.g., and corresponding rate adaptation rules), etc., which can be utilized to facilitate adjusting a preliminary data rate by a specified application margin, where the application margin can be an amount that is determined as a percentage of the preliminary data rate or is a specified amount of rate to be applied to the preliminary data rate.

In another aspect, the intelligent adaptation controller also can adjust the adjusted preliminary data rate, $R_A$ (e.g., preliminary data rate, R, as adjusted based in part on the application or service information) to obtain a desired adapted data rate, $R_{AE}$, to account for expected values of QoS factors and communication conditions metrics (e.g., RF conditions metrics) associated with the communication device and associated user. The intelligent adaptation controller can obtain information, including current or historical communication conditions associated with the communication device of the user and information related to the user (e.g., stored in a user profile), which can be utilized to predict and generate expected values of the communication conditions metrics for the next time interval. The intelligent adaptation controller also can obtain or retrieve relevant QoS/QoE information and predefined adaptation rules, where the rules can be used to determine the amount of adjustment to be made to the adjusted preliminary data rate, $R_A$. In one aspect, the rules also can specify when identified expected values of QoS factors and communication conditions metrics can be ignored (e.g., when there is a short term "blip" in the QoS factors or RF conditions). Based at least in part on the expected values of the QoS factors and communication conditions metrics, the intelligent adaptation controller can determine a volatility margin that can be applied to the adjusted preliminary data rate, $R_A$, to obtain the desired adapted data rate, $R_{AE}$. For instance, the volatility margin can be a percentage of the adjusted preliminary data rate, $R_A$, or can be a specified amount of rate. The desired adapted data rate can be used during the next time interval, where, for example, the output data rate of the intelligent adaptation node associated with a base station serving the communication device can be set to the desired adapted data rate and the input data rate of the communication device can be set to the desired adapted data rate. In an aspect, the desired data rate for the next time interval can be determined at virtually any desired time in relation to the current time interval, such as when the time threshold is reached or just prior to the time threshold being reached, or just after the time threshold is reached.

In another aspect, the communication network can employ one or more nodes (e.g., node in a wire-line access network and/or node in a wire-line core network) where information regarding a type of application or service, specific application being used, and current mode of operation for the application and service and/or other information can be obtained and provided to the intelligent adaptation controller. For example, the one or more nodes can employ deep packet inspection (DPI) to inspect the header information and payload (e.g., content) of data traffic being communication between the data source and the communication device to facilitate obtaining information regarding the application or service being used by the communication device. The intelligent adaptation controller can utilize such information to facilitate determining an amount of adjustment to be made to a preliminary data rate associated with the communication device.

In yet another aspect, the intelligent adaptation controller can dynamically and automatically trigger re-adapting a data rate associated with the communication device, even if the time threshold associated with the timer has not been reached, based at least in part on the predefined rate adaptation criteria, wherein the predefined rate adaptation criteria can indicate that dynamic triggering to re-adapting a data rate associated with the communication device is to occur, for example, when the data rate desired by the communication device with regard to the application or service changes (e.g., increases) to a predetermined data rate or by a predetermined amount of rate, or when the rate of change relating to the data rate associated with the communication device meets or exceeds a predetermined threshold rate of change.

In accordance with various aspects and embodiments, the subject innovation can be employed in a wire-line communication network, such as a communication network that employs digital subscriber line (DSL), T-1, E-1, T-3, E-3, digital signal 0 (DS0), E-0, frame relay, synchronous optical networking (SONET), asynchronous transfer mode (ATM), Internet Protocol (IP) routing, multi-protocol label switching (MPLS), optical transmission, cable, etc. In accordance with various other aspects and embodiments, the subject innovation can be employed in a wireless communication network, such as a communication network that employs global system for mobile communications (GSM), code division multiple access (CDMA), Long Term Evolution (LTE), 3G cellular, 4G cellular, ad-hoc networks, mesh networks, etc. In accordance with various other aspects and embodiments, a subject innovation can be employed in mixed wireless-wireline communication networks, such as more fully disclosed herein.

In accordance with various other aspects and embodiments, methods that can intelligently adapt data rates associated with a communication device(s) in a communication network, based at least in part on application or service parameters and/or expected values of communication conditions, are presented; and devices that can facilitate intelligently adapting data rates associated with a communication device(s) in a communication network, based at least in part on application or service parameters and/or expected values of communication conditions, are presented.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION

Figure 1:
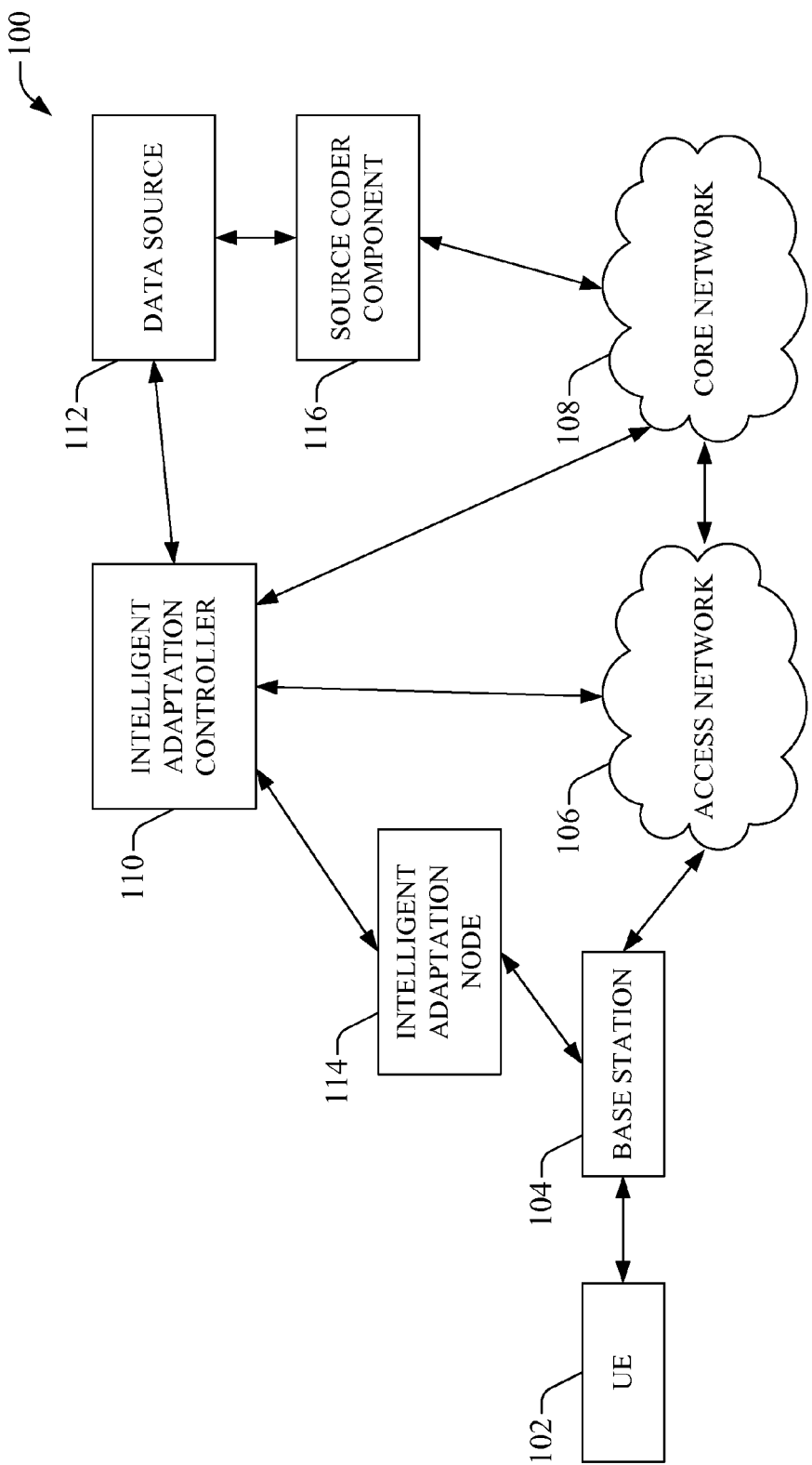
FIG. 1 is a block diagram of an example system that can perform intelligent rate adaptation associated with a communication device in a communication network in accordance with an embodiment of the disclosed subject matter.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," and the like can refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," "subscriber station," "communication device," "access terminal," "terminal," "handset," and similar terminology, refer to a wireless device (e.g., cellular phone, smart phone, computer, personal digital assistant (PDA), set top box, Internet Protocol Television (IPTV), etc.) utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," and the like are employed interchangeably throughout the subject specification, unless context warrants particular distinction(s) among the terms.

The following abbreviations are relevant to the subject specification.

3G Third Generation
3GPP Third Generation Partnership Project
AGPS Assisted GPS
AP Access Point
ADSL Asymmetric Digital Subscriber Line
AWS Advanced Wireless Services
BRAS Broadband Remote Access Server
BTA Basic Trading Area
CN Core Network
CS Circuit-Switched
CSCF Call Session Control Function
CPE Customer Premise Equipment
CPN Customer Premise Network DHCP Dynamic Host Configuration Protocol
DSL Digital Subscriber Line
DSLAM Digital Subscriber Line Access Multiplexer
E911 Enhanced 911
FCC Federal Communications Commission
FL Forward Link
GGSN Gateway GPRS Service Node
GPRS General Packet Radio Service
GPS Global Positioning System
GW Gateway
HAP Home Access Point
HSS Home Subscriber Server
ISDN Integrated Services Digital Network
UE User Equipment
UTRAN Universal Terrestrial Radio Access Network
IMS IP Multimedia Subsystem
IP Internet Protocol
ISP Internet Service Provider
MSA Metropolitan Statistical Areas
MSISDN Mobile Subscriber ISDN Number
MTA Major Trading Areas
NAT Network Address Translation
NTP Network Time Protocol
O&M Operation and Maintenance
PC Personal Computer
PCS Personal Communications Service
PS Packet-Switched
PSTN Public Switched Telephone Network
RAN Radio Access Network
RBS Radio Base Station
RL Reverse Link
RNC Radio Network Controller
RSA Rural Service Area
SGSN Serving GPRS Support Node
SIP Session Initiation Protocol
USSD Unstructured Supplementary Service Data
VPN Virtual Private Network
WAP Wireless Application Protocol
XDSL Asynchronous-DSL or Synchronous-DSL Referring to the drawings, FIG. 1 is a block diagram of an example system 100 that can perform intelligent rate adaptation associated with a communication device in a communication network in accordance with an embodiment of the disclosed subject matter. In an aspect, example system 100 can include a UE 102 (e.g., mobile communication device, such as a mobile phone (e.g., 3GPP UMTS phone); personal digital assistant (PDA); computer; IP television (IPTV); gaming console; set-top box; printer; etc.) in a communication environment (e.g., communication environment comprising a wireless portion and a wire-line portion of a communication network; communication environment comprising a wire-line communication network; communication environment comprising a wireless communication network). The UE 102 can be located in the wireless portion (e.g., region) of the communication network, for example. The UE 102 can be connected (e.g., wirelessly connected) to a base station 104 to facilitate communication in the wireless communication environment. The base station 104 can serve a coverage macro cell that can cover a specified area, and the base station 104 can service mobile wireless devices, such as UE 102, in the area covered by the macro cell, where such coverage can be achieved via a wireless link (e.g., uplink (UL), downlink (DL)). When an attachment attempt is successful, UE 102 can be served by base station 104 and incoming voice and data traffic can be paged and routed to the UE 102 through the base station 104, and outgoing voice and data traffic from the UE 102 can be paged and routed through the base station 104 to other communication devices (e.g., another UE (not shown)). The base station 104 can be located at the edge of a wire-line portion and the wireless portion of the communication network.

In an aspect, the base station 104 can be associated (e.g., connected directly, or indirectly via a radio network controller (RNC)) with an access network 106, such as a wire-line access network, which can be in the wire-line portion of the communication network and can facilitate serving a wireless service provider(s) associated with the communication network by facilitating connecting subscribers (e.g., using UE(s) 102) with the wireless service provider(s). The access network 106 can comprise components, such as routers, nodes, switches, interfaces, controllers, etc., that can facilitate communication of data between communication devices in the communication network. In another aspect, the access network 106 can be associated with a core network 108, which can be in the wire-line portion of the communication network, and can facilitate routing data between communication devices, such as UEs 102, allocating resources to UEs 102 in the network, converting or enforcing protocols, establishing and enforcing Quality of Service (QoS) for UEs 102, providing applications or services in the network, translating signals, and/or performing other functions to facilitate system interoperability and communication in the wireless communication network. The core network 108 can comprise gateways, routers, nodes, switches, interfaces, controllers, etc., to facilitate communication between communication devices (e.g., UEs 102) associated with the network.

Conventionally, in a wireless network, the QoS applied or provided to many applications is often "best effort". However, certain applications or services (e.g., video, multimedia) utilized in the wireless network are becoming more data intensive, and a QoS of "best effort" is generally not desirable and/or sufficient for many of these applications or services. Rate adaptation based on network conditions is generally not used for video or certain other applications or services, which are highly sensitive to QoS conditions such as delay/latency, jitter, packet loss, etc. Conventional systems and methods do not consider the type of application or service being used by a communication device, current mode of the application or service, or expected values of QoS factors or RF conditions associated with the communication device in determining a data rate to employ with a communication device using the application or service. As a result, conventional systems and methods do not efficiently utilize resources of the communication network.

In contrast to conventional systems and techniques, the subject innovation can take into account the application or service being utilized by a communication device, the current mode of operation (e.g., active, hold, sleep, transmitting video, transmitting audio, or other mode) of the application or service, and expected values of QoS factors and communication conditions metrics (e.g., RF conditions metrics) associated with the communication device to intelligently determine an adapted data rate to be employed with the communication device during a specified time interval. The subject innovation can thereby more efficiently utilize and distribute resources for communication devices in a communication network, as compared to conventional systems or methods.

In accordance with various aspects and embodiments, the subject innovation can control (e.g., adapt, modify, adjust) data rate, or correspondingly rate coding (e.g., a specified rate coding can result in a corresponding data rate and translates to a corresponding bandwidth), associated with a UE 102, periodically or when triggered, in the communication network. In an aspect, the system 100 can comprise an intelligent adaptation controller 110 that can adapt data rates of the UE 102 based at least in part on type of application or service, specific application or service, and/or current mode of an application or a service used by the UE 102, and/or expected values of QoS factors and RF condition metrics associated with the UE 102. Some examples of QoS-relevant factors and communications conditions metrics can include, for example: signal levels (e.g., 10 dBmw, or 10 decibels referenced to a milliwatt), noise levels, signal-to-noise ratio (SNR), available bandwidth (e.g., kbits per second), delay/latency (e.g., in milliseconds), jitter (e.g., milliseconds of delay/latency variation), availability (e.g., a specified percentage (e.g., 99.93%) of the time that use is desired), volatility of any of the above-referenced factors or metrics (e.g., standard deviations of a sequence of measurements), and rate-of-change (per unit time) of any of the above-referenced factors or metrics. Also, the above-referenced factors or metrics can be averaged over a time interval (e.g., a five minute period, an hour, a day, etc.) or can be current or instantaneous measurements or determinations.

In accordance with various aspects, the UE 102 can desire to utilize an application or a service associated with a data source 112 (e.g., computer; server, such as a media or content server; video player, audio player; PDA; phone, such as a smart phone or cellular phone; etc.). The system 100 can set up the application or service for the UE 102 (e.g., set up application or service from the source, such as data source 112, to the destination, such as the UE 102). In an aspect, the intelligent adaptation controller 110 can determine an initial data rate (and corresponding rate coding), where the initial data rate can be a predefined default data rate or a data rate that it determined based at least in part on communication conditions (e.g., RF conditions) associated with the UE 102 and/or the information relating to the application or service (e.g., type of application or service, specific application or service being used, mode of operation of the application or service, etc.). For example, initial data rate can be determined in part by evaluating the information relating to communications associated with the UE 102 in accordance with techniques that are well known in the art. The initial data rate can be used as the data rate for data communications associated with the UE 102 with regard to application or service during the initial adaptation time interval, which can be a predefined amount of time.

In an aspect, the intelligent adaptation controller 110 can transmit rate coding information relating to the initial data rate to the intelligent adaptation node 114, which can be connected to the intelligent adaptation controller 110, and the intelligent adaptation node 114 can set its the output data rate (e.g., output data rate of an encoder component associated with a variable rate codec in the intelligent adaptation node 114) to the initial data rate based at least in part on the rate coding information. In an embodiment, the intelligent adaptation node 114 can be or can comprise a variable rate codec to facilitate setting and generating various desired data rates to facilitate communication between the data source 112 and the UE 102. The intelligent adaptation node 114 also can transmit at least a portion of the rate coding information (e.g., relevant portion of the rate coding information) to the UE 102, and the UE 102 can set its input data rate (e.g., input data rate of a decoder component associated with a variable rate codec in the UE 102) to the initial data rate based at least in part on the rate coding information received by the UE 102. During the initial adaptation time interval, data relating to the application or service can be communicated between the intelligent adaptation node 114 and the UE 102 in accordance with the initial data rate.

In another aspect, the intelligent adaptation controller 110 also can be associated with a timer (not shown in FIG. 1), and the intelligent adaptation controller 110 can set the timer to a predefined initial or reset value (e.g., 0) and a value for a predefined adaptation threshold relating to periodic triggering of rate adaptation associated with the UE 102. The timer can increment (e.g., or decrement, or otherwise count time, as desired) until the predefined adaptation threshold value is reached, wherein, when the predefined adaptation threshold value is reached, the timer can be reset to the predefined reset value and the data rate to be used for communication associated with the UE 102 can be adapted for the next time interval. In another aspect, the predefined adaptation threshold (and thus, the time interval for adaptation) can vary from time interval to time interval based at least in part on the predefined rate adaptation criteria (e.g., as implemented using predefined rate adaptation rules) and current volatility of the communication conditions associated with the UE 102. For example, when the volatility of the communication conditions associated with the UE 102 is higher, the predefined adaptation threshold value can be set to a value that results in a shorter adaptation time interval, and conversely, when the volatility of the communication conditions associated with the UE 102 is lower, the predefined adaptation threshold value can be set to a value that results in a longer adaptation time interval. As a result, when communication conditions are less volatile, the rate of adaptation of data rates associated with the UE 102 can be slowed to a desired level, which can facilitate reducing processing associated with adjusting the re-coding parameters relating to the data rate.

In another aspect, when rate adaptation is periodically triggered (e.g., at end of each adaptation time interval) or dynamically triggered (e.g., when a predefined dynamic trigger condition is met), the intelligent adaptation controller 110 can obtain FB information relating to the communication conditions (e.g., signal-to-noise ratio, signal level, carrier level, power margin, etc., associated with the UE 102) and/or QoS information associated with the UE 102 from the UE 102 and/or base station 104 via the intelligent adaptation node 114. The intelligent adaptation controller 100 can determine a preliminary data rate, R, based at least in part on the communication conditions associated with the UE 102, and the preliminary data rate, R, can be used as a basis for determining the desired adapted data rate to be used to communicate data (e.g., data from data source 112) between the intelligent adaptation node 114 and UE 102 for the next adaptation time interval. For example, the intelligent adaptation controller 110 can determine the preliminary data rate, R, based at least in part on the information relating to the communication conditions associated with the UE 102 at the time the rate adaptation is being determined (e.g., at, near, or just after, the end of an adaptation time interval). The UE 102 also can provide other information, such as information relating to the application or service (e.g., type of application or service, specific application or service being used, mode of operation of the application or service, etc.), to the intelligent adaptation controller 110 to facilitate adapting data rates for the UE 102, as more fully described herein.

In still another aspect, during a current adaptation time interval, the intelligent adaptation controller 110 also can obtain other information that can be utilized to facilitate determining the desired adapted data rate to be employed with the UE 102 for the next adaptation time interval with regard to the application or service being utilized by the UE 102. The information can comprise, for example, type of application (e.g., video application, gaming application, audio application, multimedia application, voice application, textual application, etc.) or service (e.g., content provider, including provider of video content, audio content, or multimedia content; gaming service or provider; text-based service; voice-based service; etc.), specific application or service being used (e.g., specific application of a specific application provider; specific service of a specific service provider), current mode of operation (or condition) of the application or service (e.g., application or service is: in active mode, in hold mode, in temporary hold mode, in idle or sleep mode, waiting for a reply, not communicating, communicating in real-time, currently needing QoS versus not needing QoS, needing less QoS than the current QoS, communicating textual data, communicating audio data, communicating video data (or both video and audio data), communicating multimedia, communicating graphical data, in transmitting mode, in receiving mode, or in other mode(s) or condition(s)), relevant Quality of Service (QoS)/Quality of end-user Experience (QoE) information, application or service needs, requirements, and/or limits (e.g., thresholds, such as a predefined threshold relating to an amount of change from current data rate that is desired before adapting the data rate to a new data rate), such as those related to QoS or bandwidth, and predefined rate adaptation criteria (e.g., and corresponding rate adaptation rules), etc. The information relating to the application or service (e.g., type of application or service, specific application or service being used, mode of operation of the application or service, etc.) can be obtained, for example, from inspection (e.g., deep packet inspection (DPI)) of the data traffic associated with the UE 102 and relating to the application or service used by the UE 102, signaling or messages, comprising information relating to the application or service, received from the data source 112, and/or information relating to the application or service that is obtained from the UE 102.

In another aspect, the intelligent adaptation controller 110 can evaluate the information relating to the application or service (e.g., can determine or identify type of application or service used by the UE, specific application or service being used by the UE, and/or the current mode of operation of the application or service, and can evaluate such information) and the relevant QoS/QoE information, and can apply the predefined rate adaptation rules (e.g., apply the applicable rate adaptation rules to the information relating to the application or service) to such information to facilitate determining an application or service margin, which can be applied to the preliminary data rate, R, to obtain an adjusted preliminary data rate, $R_A$, to take into account application or service conditions. In an aspect, the application or service margin can be an amount that is determined as a percentage of the preliminary data rate or is a specified amount of rate to be applied to the preliminary data rate to facilitate obtaining an adjusted preliminary data rate, $R_A$. In still another aspect, there can be a rate adaptation rule relating to a predefined minimum threshold amount of rate change between an adapted data rate of the previous adaptation time interval and the data rate (e.g., adjusted preliminary data rate) under determination in order to apply the application or service margin to the preliminary data rate. For instance, the predefined minimum threshold amount of rate change can be employed to account for the potential negative effect (e.g., signaling and other overhead incurred in changing the data rate) of adapting the data rate to a different data rate in relation to the potential benefits of adapting the data rate. For example, during a particular rate adaptation determination, the preliminary data rate and application margin as calculated may result in a small change in the adapted data rate from the previous adaptation time interval, where the small change is below the predefined minimum threshold amount of rate change; and the intelligent adaptation controller 110 can determine that the current adapted data rate is not to be adapted (e.g., and can disregard adaptation of the data rate of the UE) for the next adaptation time interval (or, as desired, the intelligent adaptation controller 110 can proceed to calculate a volatility margin (as disclosed herein) and apply it to the adjusted preliminary data rate and then apply the rule relating to the predefined minimum threshold amount of rate change to determine whether to adapt the data rate).

In another aspect, the intelligent adaptation controller 110 also can adjust the adjusted preliminary data rate, $R_A$ (e.g., preliminary data rate, R, as adjusted based in part on the application or service information) to obtain a desired adapted data rate, $R_{AE}$, to account for expected values of QoS factors and communication condition metrics associated with the UE 102 and associated user. The intelligent adaptation controller 110 can obtain information, including current or historical communication conditions (e.g., a predefined number of measurements of RF conditions that are most recent and/or expected to be most relevant, where, for example, the intelligent adaptation controller 110 can filter most recent measurements to obtain the most relevant measurements using predefined filter criteria (as part of the predefined rate adaptation criteria), such as measurements taken at the same time of day, same day of week, same location or proximal location, etc.) associated with the UE 102 of the user and/or current or historical information relating to the use of the UE 102 (or other communication device) by the user (e.g., which can be stored in a user profile (not shown) associated with the user), and such information can be utilized to predict and generate expected values of the communication conditions metrics for the next adaptation time interval. For example, the intelligent adaptation controller 110 can evaluate such information to facilitate determining a volatility margin to be employed to adjust the adjusted preliminary data rate, $R_A$, (or preliminary data rate, R) and/or a trend in the communication conditions to facilitate adapting the data rate (e.g., as UE 102 moves farther away from the base station 104 the RF signal can become weaker, or as UE 102 moves closer to the base station 104 the RF signal can become stronger, and the intelligent adaptation controller 110 can evaluate information relating to the RF signals associated with the UE 102 to facilitate predicting values of communication conditions metrics).

In yet another aspect, the intelligent adaptation controller 110 can adjust how far ahead in time to predict expected values of communication conditions metrics based at least in part on how well the value predictions are working with regard to communications associated with the UE 102, where the efficacy of the value predictions can be determined based at least in part on the predefined rate adaptation criteria. For example, the criteria can be implemented using desired rules and/or thresholds (e.g., minimum threshold level, maximum threshold level) relating to the number of times rate adaptation is dynamically triggered (e.g., over a specified time interval) or volatility in communication conditions associated with the UE 102. For instance, when the predicted values of communication conditions metrics are working well, based at least in part on the predefined rate adaptation criteria, the intelligent adaptation controller 110 can predict such values as far ahead in time as it had been predicting them or can predict such values even further ahead in time; and when the predicted values of communication conditions metrics are not working well, based at least in part on the predefined rate adaptation criteria, the intelligent adaptation controller 110 can adjust how far ahead in time to predict such values to shorten how far ahead in time to predict such values.

In still another aspect, the intelligent adaptation controller 110 also can obtain or retrieve relevant QoS/QoE information and the predefined rate adaptation rules, where the rules can be used to facilitate determining the amount of adjustment to be made to the adjusted preliminary data rate, $R_A$, to obtain the desired adapted data rate, $R_{AE}$. In one aspect, the predefined rate adaptation rules also can specify when identified expected values of QoS factors and communication condition metrics can be ignored (e.g., when there is a short term "blip" in the QoS factors or RF conditions). For instance, the intelligent adaptation controller 110 can analyze the trend(s) in communication conditions associated with the UE 102, and even when communication conditions are volatile, if the future trend(s) of the communication conditions is discernible by the intelligent adaptation controller 110, short term exceptions (e.g., "blips") to the trend(s) can be ignored by the intelligent adaptation controller 110, based at least in part on the predefined rate adaptation criteria (e.g., and associated rate adaptation rules relating to when to ignore or not ignore short term exceptions to the trend(s) in communication conditions), such that extraneous rate adaptations can be avoided. For example, the intelligent adaptation controller 110 can ignore a short term exception to a trend in communication conditions associated with the UE 102 when the type of application or service, specific application or service, or mode of operation of the application or service utilized by the UE 102 is less sensitive (e.g., where a desired rule(s) can be applied to information relating to the application or service to facilitate determining sensitivity relating to the application or service), in general, or is less sensitive to the short term exception (e.g., "blip" of a particular type or particular metric, on a particular time scale, in communication conditions of the UE 102) in the trend in communication conditions. For instance, the size of a short term exception (e.g., "blip"), or the number of short term exceptions over a specified time period, to a trend in communication conditions of the UE 102 can be monitored and evaluated by the intelligent adaptation controller 110 using the predefined rate adaptation criteria to facilitate determining whether the short term exception(s) can be ignored or not.

As another example, the intelligent adaptation controller 110 can employ a set of laddered thresholds relating to a QoS factor(s) or communication conditions metric(s) to determine whether or not to ignore a short term exception (e.g., blip) to a trend in such QoS factor(s) or communication conditions metric(s) or whether to adjust an adaptation time period. In such example, each successive (larger value of change) threshold can be respectively associated with a successively shorter adaptation time period (e.g., if a first threshold value in the laddered set of thresholds is exceeded for a particular QoS factor, the adaptation time period can be shortened by a first amount as compared to the current adaptation time interval; if the second threshold value is exceeded for a particular QoS factor, the adaptation time period can be shortened by a second amount (that is greater than the first amount); etc.). The number of laddered thresholds to be employed can be determined based at least in part on the application or service (e.g., for a particular application, a set of 5 laddered thresholds can be desired; and for another application, a set of 3 thresholds may be more desirable). A short term exception (e.g., blip) in a trend for a QoS factor(s) or communication conditions metric(s) that exceeds any of the thresholds, in terms of exceeding any particular threshold for its associated period of time, is not ignored by the intelligent adaptation controller 110, and the intelligent adaptation controller 110 can adjust the adaptation time interval accordingly based at least in part on the particular threshold(s) that is exceeded (e.g., exceeding a higher threshold value can result in shortening the adaptation time interval more than if only a lower threshold value is exceeded). The intelligent adaptation controller 110 can ignore or disregard any short term exception to a trend for a QoS factor(s) or communication conditions metric(s) that does not exceed any of the applicable thresholds. A different set of thresholds (values and associated adaptation time periods) can be used for each application (or service) and/or each mode of operation of a particular application (or service). The particular number of thresholds, threshold values, and adaptation time periods respectively associated with each threshold set can be selected, for example, based at least in part on the respective needs of particular applications (or services), how their various modes of operation work (and the resulting QoS needs), and also on aspects of the provider's communications network (e.g., 2G, 3G, LTE, particular vendor base station or other equipment specifications, network topology, network design, protocols/interfaces employed, etc.) and subscriber device (e.g., cellphone, smartphone, mobile laptop, etc.) being used. The threshold sets also can be selected based at least in part on the particular level or degree of QoS that a subscriber has selected/purchased (e.g., no QoS, "bronze" or lowest level of QoS, "silver" or medium level, "gold" or best level of experience, etc.).

Based at least in part on the expected values of the QoS factors and communication conditions metrics, the intelligent adaptation controller 110 can determine a volatility margin that can be applied to the adjusted preliminary data rate, $R_A$, to obtain the desired adapted data rate, $R_{AE}$. For instance, the volatility margin can be a percentage of the adjusted preliminary data rate, $R_A$, or can be a specified amount of rate, that can be applied to the adjusted preliminary data rate, $R_A$, to increase or decrease the adjusted preliminary data rate, $R_A$, by the volatility margin amount. The desired adapted data rate can be used during the next adaptation time interval that the UE 102 is using the application or service. For example, during the next adaptation time interval, the output data rate of the intelligent adaptation node 114 associated with a base station 104 serving the UE 102 can be set to the desired adapted data rate, $R_{AE}$, and the input data rate of the UE 102 can be set to the desired adapted data rate, $R_{AE}$, to facilitate communication of data between the data source 112 and UE 102. In an aspect, the desired data rate for the next adaptation time interval can be determined at virtually any desired time in relation to the current time interval, such as when the time threshold is reached, just prior to the time threshold being reached, or just after the time threshold is reached. In another aspect, there can be a rate adaptation rule relating to a predefined minimum threshold amount of rate change between an adapted data rate of the previous adaptation time interval and the data rate (e.g., adjusted preliminary data rate that is further adjusted by the volatility margin) under determination in order to apply the volatility margin to the adjusted preliminary data rate. For example, if the predefined minimum threshold amount of rate change between the adapted data rate of the previous adaptation time interval and the determined adapted data rate, $R_{AE}$, is not met, the intelligent adaptation controller 110 can disregard the rate adaptation, as desired, and maintain the data rate at the data rate of the previous adaptation time interval for the next adaptation time interval.

As a result, the subject innovation, by employing the intelligent adaptation controller 110, can facilitate eliminating constantly conveying RF link measurements to provide FB information regarding communication conditions of a UE. Constantly conveying RF link measurements to provide FB information regarding communication conditions of a UE can consume scarce RF network bandwidth resources. The subject innovation can reduce the need for at least a portion of this overhead communication in part by predicting values of communication conditions metrics (e.g., RF conditions metrics) associated with the UE 102. Further, the subject innovation can adjust how far ahead in time to predict such values based at least in part on the predefined rate adaptation criteria, where predicting such values further ahead in time can facilitate reducing the amount of overhead relating to conveying RF link measurements by a proportionally greater amount with respect to the farther ahead in time such values are predicted. Further, the intelligent adaptation controller 110, by ignoring short term exceptions (e.g., "blips") to the trend(s) in communication conditions associated with the UE 102, based at least in part on the predefined rate adaptation criteria, can avoid extraneous rate adaptations associated with the UE 102. This can facilitate reducing processing related to changing re-coding parameters to adapt the data rate.

It is to be appreciated and understood that, in accordance with various embodiments, the adapted data rate can be determined by determining and applying an application or service margin to the determined preliminary data rate to obtain the adapted data rate; the adapted data rate can be determined by determining and applying a volatility margin to the determined preliminary data rate to obtain the adapted data rate; or the adapted data rate can be determined by determining and applying an application or service margin to obtain an adjusted preliminary data rate, and determining and applying a volatility margin to the adjusted preliminary data rate to obtain the adapted data rate.

In still another aspect, the data source 112 can be connected to a source coder component 116 (e.g., a codec, a variable rate codec) that can facilitate communicating data between the data source 112 and UE 102 at a desired data rate. For example, the source coder component 116 can receive data from the data source 112 at its input and can employ a desired rate coding so that the data rate at the output of the source coder component 116 is at a desired data rate. The output from the source coder component 116 can be transmitted through the communication network where it can be received at the input of the intelligent adaptation node 114. The intelligent adaptation node 114 can decode the received data and can encode the data at the desired adapted rate coding so that the data rate of the output data is at the desired adapted data rate to facilitate communication of the data to the UE 102. In one embodiment, the source coder component 116 can be a variable rate codec.

In another aspect, the communication network can employ one or more nodes (e.g., node(s)), such as an inspection component(s) (not shown in FIG. 1), in the access network 106 and/or node(s) in the core network 108) where information regarding a type of application or service, specific application being used, current mode of operation for the application or service, and/or other information can be obtained and provided to the intelligent adaptation controller 110. For example, the one or more nodes can employ deep packet inspection (DPI) to inspect the header information and payload (e.g., content) of data traffic being communicated between the data source 112 and the UE 102 to facilitate obtaining information regarding the application or service being used by the UE 102, where the information can comprise the type of data (e.g., video, audio, multimedia, graphical, textual, etc.) being communicated to the UE 102, the status (e.g., mode of operation) or condition of the application or service, etc. The intelligent adaptation controller 110 can utilize such information to facilitate determining an amount of adjustment to be made to a preliminary data rate (or adjusted preliminary data rate) associated with the UE 102 to facilitate determining the desired adapted data rate to be employed for communications associated with the UE 102 with regard to the application or service being utilized.

In yet another aspect, the intelligent adaptation controller 110 can dynamically and automatically trigger re-adapting a data rate associated with the UE 102, even if the time threshold associated with the timer has not been reached, based at least in part on the predefined rate adaptation criteria. For instance, the predefined rate adaptation criteria can indicate that dynamic triggering to re-adapt a data rate associated with the UE 102 is to occur, for example, when the data rate desired by the UE 102 with regard to the application or service changes (e.g., increases) to a predetermined data rate or by a predetermined amount of rate, or when the rate of change relating to the data rate associated with the communication device meets or exceeds a predetermined threshold rate of change. When a condition for dynamically triggering to re-adapt the data rate associated with the UE 102 is met, the intelligent adaptation controller 110 can dynamically and automatically trigger re-adaptation of the data rate associated with the UE 102. In such instance, the intelligent adaptation controller 110 can determine or calculate the preliminary data rate, R, adjusted preliminary data rate, $R_A$, and the desired adapted data rate, $R_{AE}$, in accordance with the subject matter disclosed herein. The intelligent adaptation controller 110 optionally can re-set the timer to the predefined reset value, or can allow the timer to continue to proceed in tracking the time under the current time interval, as desired.

In accordance with various aspects and embodiments, the subject innovation can be employed in conjunction with a multi-tier architecture that facilitates respective adaptation of data rates in respective tiers of a communication network having multiple tiers, such as more fully described in patent application Ser. No. 12/415,424, entitled "Adaptive Multi-Tiered Re-Coding For Improved Communications Resource Utilization", filed on Mar. 31, 2009, the entirety of which is incorporated herein by reference. In an aspect, the communication network can comprise two or more tiers, where there can be a bottom tier that includes an edge adaptation node (e.g., intelligent adaptation node 114) that facilitates adaptation of data rates associated with the UE 102 based at least in part on a first rate adaptation time interval, which can be the shortest rate adaptation time interval (e.g., based in part on a short rate adaptation time threshold) to facilitate adapting data rates associated with the UE 102 on a more frequent basis than the other tier(s) in the network; a top tier that can include a source adaptation node (e.g., source coder component 116, comprising a variable rate codec) that can be associated with the data source 112 and can facilitate adapting data rates for the upper tier (e.g., at the output of the source adaptation node) based at least in part on a long rate adaptation time interval (e.g., based in part on a long rate adaptation time threshold), which can be the longest rate adaptation time interval to facilitate adapting data rates associated with the upper tier less frequently than any lower tier(s) (e.g., bottom tier, middle tier); and, as desired, there can be one or more middle or intermediate tiers that can be in between the top tier and bottom tier (e.g., can be located in the core network, access network, or elsewhere in the network, as desired), where each middle tier can comprise an intermediate adaptation node that can facilitate adapting data rates associated with the middle tier (e.g., output data rate of the intermediate adaptation node and input data rate of a node in the next lower tier can be adapted) based at least in part on an applicable intermediate rate adaptation time interval (e.g., based in part on an intermediate rate adaptation time threshold) which can be a shorter period of time than the interval of the tier(s) (e.g., top tier) above the middle tier and a longer period of time than the interval of the tier(s) (e.g., bottom tier) below the middle tier in the communication network.

In an aspect, the intelligent adaptation controller 110 can adapt the data rates of the respective tiers (e.g., at the respective adaptation nodes, such as intelligent adaptation node 114 and source coder component 116, the UE 102, and/or other nodes or components) at the end of their respective rate adaptation time intervals (or when dynamically triggered) based at least in part on the predefined rate adaptation criteria. Utilizing the predefined rate adaptation criteria (e.g., and the predefined rate adaptation rules based thereon) the intelligent adaptation controller 110 can obtain (e.g., via inspection (e.g., DPI) of data packets, or from the UE 102 and/or data source 112) information relating to the application or service (e.g., type of application or service, specific application or service, mode of operation of the application or service) from desired points in the network and relevant QoS/QoE information, and can utilize such information and applicable rules (e.g., in accordance with the predefined rate adaptation criteria) to facilitate respectively adapting data rates associated with respective tiers (e.g., determining an adapted data rate for a particular tier, determining an adjustment to a preliminary data rate associated with a particular tier, determining an application or service margin associated with a rate adaptation for a particular tier, determining or adjusting a rate adaptation time interval associated with a particular tier, determining whether to dynamically trigger rate adaptation of a tier(s), etc.) of a communication network comprising multiple tiers. In addition to or alternatively, the intelligent adaptation controller 110 can obtain information regarding current or historical communication conditions associated with the UE 102, information regarding usage associated with the specific user of the UE 102 (e.g., as contained in a user profile), and/or relevant QoS/QoE information, and can utilize such information and applicable rules (e.g., in accordance with the predefined rate adaptation criteria) to facilitate respectively adapting data rates associated with respective tiers (e.g., predicting expected values of QoS factors or communication conditions metrics, determining an adapted data rate for a particular tier, determining an adjustment to a preliminary data rate or adjusted preliminary data rate associated with a particular tier, determining a volatility margin associated with a rate adaptation for a particular tier, determining or adjusting a rate adaptation time interval associated with a particular tier, determining whether to dynamically trigger rate adaptation of a tier(s), etc.) of a communication network comprising multiple tiers.

In accordance with various aspects and embodiments, the subject innovation can be employed in a wire-line communication network, such as a communication network that employs digital subscriber line (DSL), T-1, E-1, T-3, E-3, digital signal 0 (DS0), E-0, frame relay, synchronous optical networking (SONET), asynchronous transfer mode (ATM), Internet Protocol (IP) routing, multi-protocol label switching (MPLS), optical transmission, cable, etc. In accordance with various other aspects and embodiments, the subject innovation can be employed in a wireless communication network, such as a communication network that employs global system for mobile communications (GSM), code division multiple access (CDMA), Long Term Evolution (LTE), 3G cellular, 4G cellular, ad-hoc networks, mesh networks, etc. In accordance with various other aspects and embodiments, a subject innovation can be employed in mixed wireless-wireline communication networks, such as more fully disclosed herein.

In accordance with various embodiments, the intelligent adaptation node 114 can employ or can comprise an encoder-decoder(s) (e.g., transcoder, re-coder) (not shown in FIG. 1) that can be a variable rate codec(s) that can be utilized to facilitate intelligent adaptive rate coding associated with the UE(s) 102. In an aspect, the encoder-decoder(s) can employ intelligent adaptive rate coding to provide a desired level of compression to reduce the amount of bandwidth utilized to transmit the data from the data source 112 or other point in the system 100 to the UE(s) 102, where the reduction in bandwidth consumption can thereby improve resource utilization. In another aspect, the encoder-decoder(s) can employ intelligent adaptive rate coding to pass the original data stream through, without any compression or manipulation, if the encoder-decoder(s) is not able to sense or determine the type(s) of coding scheme used in the original data stream or as otherwise desired. In still another aspect, the compression of data by the encoder-decoder(s) can be lossless, which can allow the full original source bit rate to be recovered, or lossy, which does not allow the full amount of the original bit rate to be recovered, or some other type of compression, where a desired compression/decompression algorithm (e.g., algorithm based at least in part on the Lempel-Ziv (LZ) compression method, including LZ-Welch, LZ-Renau, or Huffman) can be employed to facilitate compressing or decompressing the data.

In an aspect, the adaptation of the data rate used to communicate data between a data source 112 and UE 102 can be based at least in part on the predefined rate adaptation criteria. The predefined rate adaptation criteria can relate to, for example, QoS and/or communication conditions (e.g., RF or radio link conditions) associated with the wireless communication device (e.g., UE 102) in the wireless portion of the network; whether the data rate is being adapted due to a periodic adaptation or a triggered adaptation; the margin(s) (e.g., application margin, volatility margin) being employed or determined; the type of application or service being used by the communication device; the specific application or service being used by the communication device; the mode of operation of the application or service being utilized by the communication device; expected or predicted values for QoS and communication conditions; the particular tier for which the data rate is being adapted, the number of tiers in the communication network, the respective FB loop lengths of respective tiers, the maximum recoverable data rate for the tier above the tier being adapted (e.g., when the data rate associated with a middle tier is being adapted, the maximum recoverable data rate for the top tier can be considered), whether the data rate of the particular tier is being adapted due to a periodic adaptation or a triggered adaptation, average data rate for data rates of a lower tier (e.g., tier immediately beneath the tier being adapted, ranging from top tier to lower tier) during the most recent applicable adaptation time interval, trending data rate for a lower tier (e.g., tier immediately beneath the tier being adapted, ranging from top tier to lower tier) during the most recent applicable adaptation time interval, the particular margin employed for a particular adaptation (e.g., application/service margin or volatility margin employed for a bottom tier, application/service margin or volatility margin employed for a middle tier, application/service margin or volatility margin employed for a top tier), and/or other rate adaptation criteria.

In another aspect, the amount of a particular margin (e.g., application or service margin, volatility margin) can be dynamically determined, calculated, or inferred based at least in part on information relating to the application or service used by the UE 102, current or historical communication conditions associated with the UE 102, relevant QoS/QoE information, and/or other information, and the predefined rate adaptation criteria. As one non-limiting example, if an amount of a particular margin is determined as a function of the amount of the preliminary data rate (or adjusted preliminary data rate) as calculated over the last adaptation time interval (e.g., percentage of the preliminary data rate (or percentage of the adjusted preliminary data rate)), but the intelligent adaptation controller 110 (e.g., or an intelligent component (not shown)) observes that historically such a margin amount has been resulting in an undesirable frequency of triggering of re-adaptations of the data rate associated with the UE 102, the intelligent adaptation controller 110 can dynamically determine, calculate, or infer a desired amount of margin (e.g., different from the percentage of the preliminary data rate (or different from the percentage of the adjusted preliminary data rate)) to be utilized to adjust the preliminary data rate (or the adjusted preliminary date rate) to determine the adapted data rate to be used to communicate data to the UE 102 over the next adaptation time interval.

In accordance with various aspects and embodiments, the subject innovation can be employed in a wire-line communication network (e.g., having no wireless portion of the network), such as a communication network that employs digital subscriber line (DSL), T-1, E-1, T-3, E-3, digital signal 0 (DS0), E-0, frame relay, synchronous optical networking (SONET), asynchronous transfer mode (ATM), Internet Protocol (IP) routing, multi-protocol label switching (MPLS), optical transmission, cable, etc. In accordance with various other aspects and embodiments, the subject innovation can be employed in a wireless communication network, such as a communication network that employs global system for mobile communications (GSM), code division multiple access (CDMA), Long Term Evolution (LTE), 3G cellular, 4G cellular, ad-hoc networks, mesh networks, Wi-Fi, Wi-Max, networks employing femto APs or pico APs, etc.

In accordance with various other aspects and embodiments, the subject innovation can be employed in mixed wireless-wireline communication networks (e.g., where, in addition to data flowing down from a data source to a UE, data can flow up to a central core and then back to a UE). For example, a data source (e.g., 114) can be connected to a wire-line edge network portion (e.g., T3, ... ) of a communication network attached to a wire-line access network portion (e.g., SONET, ... ), which can be attached to a wire-line core network portion (e.g., MPLS, ... ) that is attached to an access/backhaul wire-line network portion (e.g., Metro Ethernet, ATM, ... ), which can be attached to an edge wireless network (e.g., GSM, LTE, ... ), where a wireless UE (e.g., 102) can be connected, and where data can be communicated between the data source 114 and UE 102. It is to be appreciated and understood that the above example is one non-limiting example and the subject innovation is not so limited, as virtually any desired configuration can be employed in a wire-line communication network, a wireless communication network, or communication network comprising a wire-line portion(s) and wireless portion(s), to facilitate intelligent adapted re-coding for data communications.

The subject innovation, by employing intelligent adaptive re-coding, which can take into account factors, such as type of application, specific application being used, mode of application, and expected or predicted values of relevant QoS factors and communication conditions, in adapting data rates associated with a communication device can facilitate improving accuracy and effectiveness with regard to re-coding, especially from the point of view of a communication device user, as compared to conventional systems and techniques for rate coding. The rate adaptation for the communication device can be continually optimized based at least in part on current volatility of QoS factors and network conditions (e.g., RF conditions) associated with the communication device. The subject innovation can selectively ignore short term "blips" in the values of QoS factors and network conditions based at least in part on application or service needs and limitations, and the predefined rate adaptation criteria. For example, the subject innovation can determine whether ignoring the "blip" will negatively impact use of the application or service by the communication device user. The subject innovation also is readily scalable as the intelligent adaptation node (e.g., re-coder) is readily scalable and can be used for multiple applications or services, such as voice-related applications or services, video-related applications or services, video gaming, QoS sensitive interactive services, etc., as compared to conventional systems or techniques that only perform rate adaptation of voice applications.

The subject innovation, by including mode awareness with regard to the application or service, can obtain and use information regarding the mode of operation of the application or service being used by the communication device to facilitate efficient and accurate rate adaptation for a communication device. For instance, the subject innovation can take into account different modes of operation of an application or a service, where the different modes can utilize or desire different levels of QoS, and can adapt the data rate for the communication device based at least in part on the level of QoS desired or needed in accordance with the current mode of the application or service (e.g., a higher level of QoS can be provided to a communication device when the current mode of the application or service demands a higher level of QoS; and a lower level of QoS can be provided to the communication device when the current mode of the application or service only requires a lower level of QoS). The subject innovation also can intelligently adapt data rates associated with a UE 102 based at least in part on FB inputs that provide measures of current QoS and communication conditions associated with the UE 102 (e.g., can reduce application or service resolution and associated bandwidth use when communication conditions require it (e.g., signal-to-noise ratio level decreases to too low a level) and can increase application or service resolution and associated bandwidth use when communication conditions allow for it (e.g., when signal-to-noise ratio level is sufficiently high enough)). In an aspect, the subject innovation can implement aspects of the intelligent adaptive recoding in hardware and/or software, where implementation in hardware can result in faster speed of adaptations. In another aspect, the subject innovation can implement the intelligent adaptive rate coding (e.g., employing the intelligent adaptation controller 110 and associated components) in the communication network, which can facilitate efficient scalability, so that processing capacity can be added as desired or needed, and so multiple different applications or services can utilize the intelligent adaptive rate coding, as disclosed herein, although it is to be appreciated and understood that the intelligent adaptive rate coding can be implemented separately for each application or service, as desired. As a result, the subject innovation can improve efficiency in use of resources in the network and improve QoS overall for communication devices in the network, as compared to conventional systems and techniques (e.g., the subject innovation can more intelligently use the limited amount of radio network resources to thereby allow improved QoS allotment to communication devices associated with the network, as compared to conventional systems and techniques).

It is to be appreciated and understood that the subject innovation is depicted in FIG. 1 as having one UE 102, one base station 104, one data source 112, one intelligent adaptation node 114, and one source coder component 116; however, the subject innovation is not so limited, as there also can be more than one UE 102, base station 104, data source 112, intelligent adaptation node 114, or source coder component 116, as desired. Further, while the source coder component 116 is depicted as being associated with one data source 112, and the intelligent adaptation node 114 is depicted as being associated with one base station 104 and one UE 102, it is to be appreciated and understood that one or more UEs 102 can be associated with the base station 104 and/or the intelligent adaptation node 114; UEs 102 respectively associated with disparate base stations 104 can be associated with the same intelligent adaptation node 114; and/or one or more data sources 112 can be associated with the same source coder component 116. It is to be further appreciated and understood that, while the intelligent adaptation controller 110 is shown as being a stand-alone unit, the subject innovation is not so limited, as, in accordance with various embodiments, portions (e.g., components) of the intelligent adaptation controller 110 can be distributed as separate components throughout the system 100, as desired.

In accordance with one embodiment of the subject innovation, one or more components (e.g., intelligent adaptation controller 110) in the network can utilize artificial intelligence (AI) methods to infer (e.g., reason and draw a conclusion based at least in part on a set of metrics, arguments, or known outcomes in controlled scenarios) a data rate or corresponding rate coding to be applied to the UE 102, intelligent adaptation node 114, and/or other components; whether to dynamically trigger re-adaptation of a data rate associated with the UE 102, intelligent adaptation node 114, and/or other components; one or more communication conditions associated with the UE 102; amount of a margin (e.g., application margin, volatility margin) to be employed for an adaptation of a data rate; whether to adjust an adaptation time interval; etc. Artificial intelligence techniques typically can apply advanced mathematical algorithms—e.g., decision trees, neural networks, regression analysis, principal component analysis (PCA) for feature and pattern extraction, cluster analysis, genetic algorithm, and reinforced learning—to historic and/or current data associated with system 100 to facilitate rendering an inference(s) related to the system 100.

In particular, the one or more components in the network can employ one of numerous methodologies for learning from data and then drawing inferences from the models so constructed, e.g., Hidden Markov Models (HMMs) and related prototypical dependency models. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed. Moreover, game theoretic models (e.g., game trees, game matrices, pure and mixed strategies, utility algorithms, Nash equilibria, evolutionary game theory, etc.) and other approaches that perform data fusion, etc., can be exploited in accordance with implementing various automated aspects described herein. The foregoing methods can be applied to analysis of the historic and/or current data associated with system 100 to facilitate making inferences or determinations related to system 100.

Figure 2:
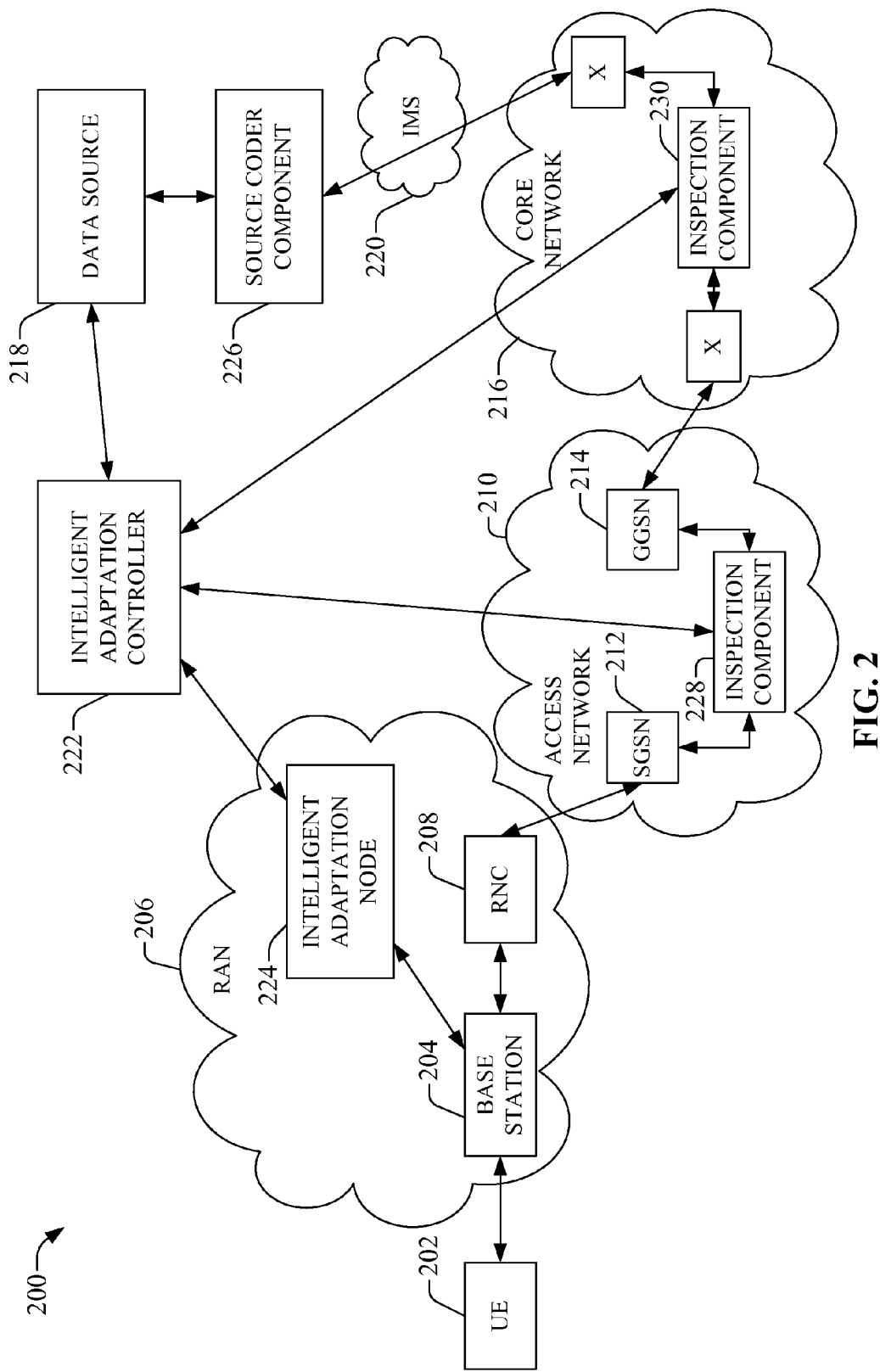
FIG. 2 is a block diagram of an example system that can perform intelligent rate adaptation associated with a communication device in a communication network in accordance with another embodiment of the disclosed subject matter.

FIG. 2 is a block diagram of an example system 200 that can perform intelligent rate adaptation associated with a communication device in a communication network in accordance with another embodiment of the disclosed subject matter. In an aspect, the example system 200 can control rate coding associated with communication devices (e.g., wireless communication devices) to facilitate efficient adaptation of rate coding associated with the communication devices to provide desired QoS for applications or services utilized by the communication devices, which can avoid or reduce dropped connections with communication devices, while simultaneously improving utilization of overall network resources.

The example system 200 can comprise a UE 202 (e.g., mobile communication device, such as a mobile phone (e.g., mobile communication device, such as a mobile phone (e.g., 3GPP UMTS phone); personal digital assistant (PDA); computer; IP television (IPTV); gaming console; set-top box; printer; etc.) in a communication environment (e.g., communication environment comprising a wireless portion and a wire-line portion of a communication network; communication environment comprising a wire-line portion of a communication network). In an aspect, the UE 202 can be located in the wireless portion (e.g., region) of the communication network, for example. The UE 202 can be connected (e.g., wirelessly connected) to a base station 204 to facilitate communication in the wireless communication environment. The base station 204 can serve a coverage macro cell that can cover a specified area, and the base station 204 can service wireless devices (e.g., wireless mobile devices), such as UE 202, in the area covered by the macro cell, where such coverage can be achieved via a wireless link (e.g., UL, DL). When an attachment attempt is successful, UE 202 can be served by base station 204 and incoming voice and data traffic can be paged and routed to the UE 202 through the base station 204, and outgoing voice and data traffic from the UE 202 can be paged and routed through the base station 204 to other communication devices (e.g., another UE (not shown)). The base station 204 can be located at the edge of a wire-line portion and the wireless portion of the communication network, for example.

In an aspect, the system 200 can include a radio access network (RAN) 206, such as a high-speed packet access (HSPA) RAN, that can be utilized to facilitate communication between communication devices, such as the UE 202, associated with or in the wireless portion of the network. The base station 204 can be in or associated with the RAN 206. The RAN 206 also can contain a radio network controller (RNC) 208 that can facilitate controlling routing of data between the base station 204 (or other base stations in or associated with the RAN 206) and an access network 210 (e.g., a wire-line access network). For instance, as desired, there can be one or more RNCs 208 in the communication network (e.g., an RNC 208 for each cell in the communication network).

The access network 210 can be in the wire-line portion of the communication network and can facilitate serving a wireless service provider(s) associated with the communication network by facilitating connecting subscribers (e.g., using UE(s) 202) with the wireless service provider(s). The access network 210 can include a serving GPRS support node (SGSN) 212, which can be associated with the RNC 208 to facilitate communication of data, in accordance with specified protocols, between the RAN 206 and access network 210. The access network 210 can contain a gateway GPRS support node (GGSN) 214 that can facilitate communication of data between the access network 210 and a core network 216. The access network 210 also can comprise other components, such as routers, nodes, switches, interfaces, controllers, etc., that can facilitate communication of data between communication devices in the communication network.

The core network 216 also can be in the wire-line portion of the communication network and can facilitate routing data between communication devices, such as UEs 202 and/or data sources 218, allocating resources for UEs 202 in the network, establishing and enforcing QoS for UEs 202, providing applications or services in the network, etc. The core network 216 also can comprise gateways, routers, nodes, switches, interfaces, controllers, etc., to facilitate communication between communication devices (e.g., UEs 202) associated with the network. The core network 216 can be associated with the data source(s) 218 via an IP multimedia subsystem (IMS) 220 (e.g., 3GPP), where the data source 218 can be a server, a computer, or other communication device that can provide data (e.g., video content, audio content, multimedia content, textual content, etc.) to communication devices, such as UE 202, associated with the communication network.

In accordance with an aspect, the system 200 can comprise an intelligent adaptation controller 222 that can intelligently control data rates associated with a UE(s) 202 in the communication network, based at least in part on information relating to the application or service being used by the UE(s) 202 and/or expected values of QoS factors and communication conditions metrics associated with the UE(s) 202, and in accordance with the predefined rate adaptation criteria. System 200 also can include an intelligent adaptation node 224, which can be associated with (e.g., connected to) the intelligent adaptation controller 222. The intelligent adaptation node 224 can be in or associated with the RAN 206 and can be associated with the base station 204 to facilitate obtaining feedback (FB) information regarding communication conditions associated with the UE 202 (e.g., RF condition, QoS condition, or other information, such as information relating to volatility associated with the UE 202) from the base station 204 and/or UE 202 (via the base station 204), and the FB information can be communicated to the intelligent adaptation controller 222 to facilitate determining an adapted rate coding associated with the UE 202 when a next adaptation time interval occurs or when rate adaptation is dynamically triggered. The intelligent adaptation node 224 can receive information, including rate coding information, from the intelligent adaptation controller 222, which can be utilized to set or adapt the input data rate to and output data rate from an encoder-decoder (not shown) associated with the intelligent adaptation node 224, and the input data rate for the UE 202. In another aspect, the data source 218 can be associated with a source coder component 226 which can facilitate encoding or decoding data at respective desired data rates. For example, the source coder component 226 can receive data from the data source 218 and can encode the data using a desired rate coding, corresponding to a desired data rate, and the data can be output from the source coder component 226 through the communication network to the intelligent adaptation node 224, which can have its input data rate set to correspond with the output data rate of the source coder component 226. In an embodiment, the source coder component 226 can be or can comprise a variable rate codec that includes an encoder and decoder.

In accordance with various aspects, UE 202, base station 204, access network 210, core network 216, data source 218, intelligent adaptation controller 222, intelligent adaptation node 224, and other components in system 200, respectively can comprise the same or similar features and functionality as respectively named components described more fully herein, for example, with regard to system 100.

In accordance with various aspects, the system 200 also can comprise an inspection component 228 that can be located in the access network 210 and associated with (e.g., connected to) SGSN 212 and GGSN 214. System 200 further can include an inspection component 230 that can be located in the core network 216 and associated with various components in the core network 216. The inspection components 228 and 230 also can be associated with the intelligent adaptation controller 222 and can monitor and inspect data traffic that is being communicated between the data source 218 and the UE 202 to obtain information relating to the application or service being used by the UE 202.

In an aspect, the inspection components 228 and 230 can employ virtually any desired level of inspection of the data traffic associated with the UE 202. For instance, the inspection components 228 and 230 can perform DPI to inspect not only the header information associated with the data traffic, but also the payload associated with the data traffic. As desired, the inspection components 228 and 230 also can perform lower levels of inspection, such as inspecting the header information, but not the payload, of the data traffic associated with the UE 202. The information relating to the application or service that is obtained from the data traffic associated with the UE 202 can include, for example, the type of application or service being used, the specific application or service being used, the current mode of operation of the application or service being used, QoS-related information, bandwidth-related information, etc. As desired, additionally or alternatively, information relating to the application or service can be obtained by the intelligent adaptation controller 222 from the data source 218 and/or the UE 202.

The respective inspection components 228 and 230 (and/or the data source 218 and/or UE 202) can provide the information relating to the application or service to the intelligent adaptation controller 222, and the intelligent adaptation controller 222 can utilize such information, other information (e.g., FB information relating to communication conditions associated with the UE 202; information relating to the user, such as information in a user profile associated with the user; relevant QoS/QoE information), and the predefined rate adaptation criteria to determine an adapted data rate to be employed for data traffic being communicated to the UE 202 when an adaptation time interval occurs (e.g., when the timer associated with the intelligent adaptation controller 222 reaches a predefined time threshold for rate adaptation) or when rate adaptation is dynamically triggered.

For instance, when an application or service associated with data source 218 is set up for a UE 202, information relating to the communication conditions of the UE 202 (e.g., signal-to-noise ratio, signal level, carrier level, power margin, etc., associated with the UE 102) can be monitored by the UE 202 and/or base station 204, and such information can be obtained by the intelligent adaptation controller 222 from the UE 202 and/or base station 204 via the intelligent adaptation node 224. The intelligent adaptation controller 222 can determine an initial data rate based at least in part on the information relating to the communication conditions associated with the UE 202 (e.g., initial data rate can be determined in part by evaluating the information relating to communications associated with the UE 202, for example, in accordance with techniques that are well known in the art).

The intelligent adaptation controller 222 can transmit information relating to the desired rate coding to the intelligent adaptation node 224, which can receive such information. Based at least in part on such information, the intelligent adaptation node 224 can set its input data rate to a data rate that corresponds to the output data rate of the source coder component 226 and can set its output data rate to correspond to the initial data rate. The intelligent adaptation node 224 also can communicate at least a portion of the information relating to rate coding to the UE 202 via the base station 204, and the UE 202 can evaluate such information and can set its input data rate to correspond to the initial data rate based at least in part on such information.

The intelligent adaptation controller 222 also can set the timer to a predefined initial or reset value where the timer can track time until a predefined adaptation time threshold has been reached. When the predefined adaptation time threshold is reached, the intelligent adaptation controller 222 can determine an adapted data rate that can be utilized to communicate data to the UE 202 during the next adaptation time interval (e.g., corresponding to the length of time between the predefined reset value and the predefined adaptation time threshold (which can vary based in part on volatility of the communication conditions associated with the UE 202)). During the current adaptation time interval, the communication conditions associated with the UE 202 can be monitored. The intelligent adaptation controller 222 can receive information regarding the communication conditions associated with the UE 202. The inspection components 228 and 230 can monitor and inspect (e.g., DPI) the data traffic communicated between the data source 218 and UE 202, and can obtain information relating to the application or service being used by the UE 202. The information relating to the application or service can be transmitted to the intelligent adaptation controller 222, which can evaluate such information (e.g., type of application or service, specific application or service being used, current mode of operation of the application or service), information relating to the communication conditions associated with the UE 202, historical information relating to communication conditions associated with the UE 202, and the predefined rate adaptation criteria, to facilitate determining the desired adapted data rate to use during the next adaptation time interval.

For instance, the intelligent adaptation controller 222 can calculate a preliminary data rate (e.g., base or default data rate), R, which can be calculated based at least in part on current communication conditions associated with the UE 202 (e.g., at or near the time adaptation of the data rate associated with the UE 202 is periodically triggered or dynamically triggered). In an aspect, the intelligent adaptation controller 222 can utilize the information relating to the application or service, and also can look up and employ QoS/QoE information and predefined application/service rules, to determine an adjusted preliminary data rate, $R_A$, where the adjusted preliminary data rate, $R_A$, can be the calculated data rate, R, as adjusted (e.g., increased, decreased, or maintained at the same rate) by an application margin, AM (e.g., a percentage (AM %) applied to the data rate, R, or a specified amount of rate applied to the data rate, R). The QoS/QoE information can specify QoS or bandwidth requirements and limits (or predefined threshold levels) (e.g., predetermined minimum threshold level of QoS) for the application or service used by the UE 202.

The intelligent adaptation controller 222 also can further adjust (e.g., increase or decrease) the adjusted preliminary data rate, $R_A$, to account for expected values of QoS factors and communication condition metrics to facilitate determining the adapted data rate, $R_{AE}$, to be used during the next adaptation time interval. The intelligent adaptation controller 222 can retrieve or look up historical information regarding communication conditions associated with the UE 202 and information relating to the associated user (e.g., stored in a user profile), applicable QoS/QoE information, and predefined expectation rules (e.g., based at least in part on the predefined rate adaptation criteria), and can use such information and rules to determine, predict or infer expected values for QoS factors and communication conditions metrics associated with the UE 202, which can be used to facilitate determining a volatility margin (e.g., percentage (VM %) that can be applied to the adjusted preliminary data rate, $R_A$; or a specified amount of rate that can be applied to the adjusted preliminary data rate, $R_A$), VM, that can be applied to the adjusted preliminary data rate, $R_A$, in order to obtain the desired adapted data rate, $R_{AE}$. The predefined expectation rules can be utilized to not only determine the volatility margin, VM (and associated threshold values relating to the amount of rate adjustment to be applied), but also can specify when changes in communication conditions metrics or QoS factors are to be ignored (e.g., rule(s) can specify that a particular change in communication conditions metrics or QoS factors are to be ignored when the particular change is a short term "blip" and/or when ignoring the change will not affect or will minimally affect use of the application or service).

The intelligent adaptation controller 222 can transmit information relating to the desired adapted data rate (e.g., desired rate coding that corresponds to the adapted data rate) to the intelligent adaptation node 224. The intelligent adaptation node 224 can set its output data rate to the desired adapted data rate, and its input data rate can be set to a data rate that corresponds to the output data rate of the source coder component 226, for the next adaptation time interval. The intelligent adaptation node 224 also can communicate at least a portion of the information relating to the desired adapted data rate to the UE 202 via the base station 204, and the UE 202 can set its input data rate to the desired adapted data rate for the next adaptation time interval. As a result, data from the data source 218 can be encoded by the source coder component 226 SO that the data is output from the source coder component 226 at a specified data rate; the intelligent adaptation node 224 can receive the data output from the source coder component 226 and can decode the data; the intelligent adaptation node 224 can encode the data using a rate coding that corresponds to the adapted data rate, and the data can be output from the intelligent adaptation node 224 to the UE 202 at the adapted data rate; and the UE 202 can receive the data at the adapted data rate, and the UE 202 can decode the received data. The intelligent adaptation controller 222 can continue to perform rate adaptation associated with the UE 202 until the UE 202 exits the application or service.

In accordance with another aspect, the intelligent adaptation controller 222 also can dynamically and automatically trigger adaptation of a data rate associated with the UE 202, even when the adaptation time threshold associated with the timer has not been reached, based at least in part on the predefined rate adaptation criteria. For instance, the predefined rate adaptation criteria can provide that re-adaptation of a data rate associated with the UE 202 is to be dynamic triggered, for example, when the data rate desired by the UE 202 with regard to the application or service changes (e.g., increases) to a predetermined data rate or by a predetermined amount of rate, or when the rate of change relating to the data rate associated with the communication device meets or exceeds a predetermined threshold rate of change. When a condition for dynamically triggering to re-adapt the data rate associated with the UE 202 is met, the intelligent adaptation controller 222 can dynamically and automatically trigger re-adaptation of the data rate associated with the UE 202. In such instance, the intelligent adaptation controller 222 can determine or calculate the preliminary data rate, R, adjusted preliminary data rate, $R_A$, and the desired adapted data rate, $R_{AE}$, in accordance with the subject matter disclosed herein. As desired, the intelligent adaptation controller 222 can re-set the timer to the predefined reset value to start a new adaptation time interval, or can allow the timer to continue to proceed in tracking the time under the current adaptation time interval.

It also is to be appreciated and understood that the subject innovation is depicted in FIG. 2 as having one UE 202, one base station 204, one RNC 208, one SGSN 212, one GGSN 214, one data source 218, one intelligent adaptation controller 222, one intelligent adaptation node 224, one source coder component 226, and two inspection components 228 and 230; however, the subject innovation is not so limited, as there also can be more than one of UE 202, one base station 204, one RNC 208, one SGSN 212, one GGSN 214, one data source 218, one intelligent adaptation controller 222, one intelligent adaptation node 224, or one source coder component 226; and less or more than two inspection components 228 and 230, as desired. Further, while the source coder component 226 is depicted as being associated with one data source 218, and the intelligent adaptation node 224 is depicted as being associated with one base station 204 and one UE 202, it is to be appreciated and understood that one or more UEs 202 can be associated with the base station 204 and/or intelligent adaptation node 224; UEs 202 respectively associated with disparate base stations 204 can be associated with the same intelligent adaptation node 224; and/or one or more data sources 218 can be associated with the same source coder component 226. It is to be further appreciated and understood that, while the intelligent adaptation controller 222 is shown as being a stand-alone unit, the subject innovation is not so limited, as, in accordance with various embodiments, portions (e.g., components) of the intelligent adaptation controller 222 can be distributed in various regions of the communication network in the system 200, as desired.

Figure 3:
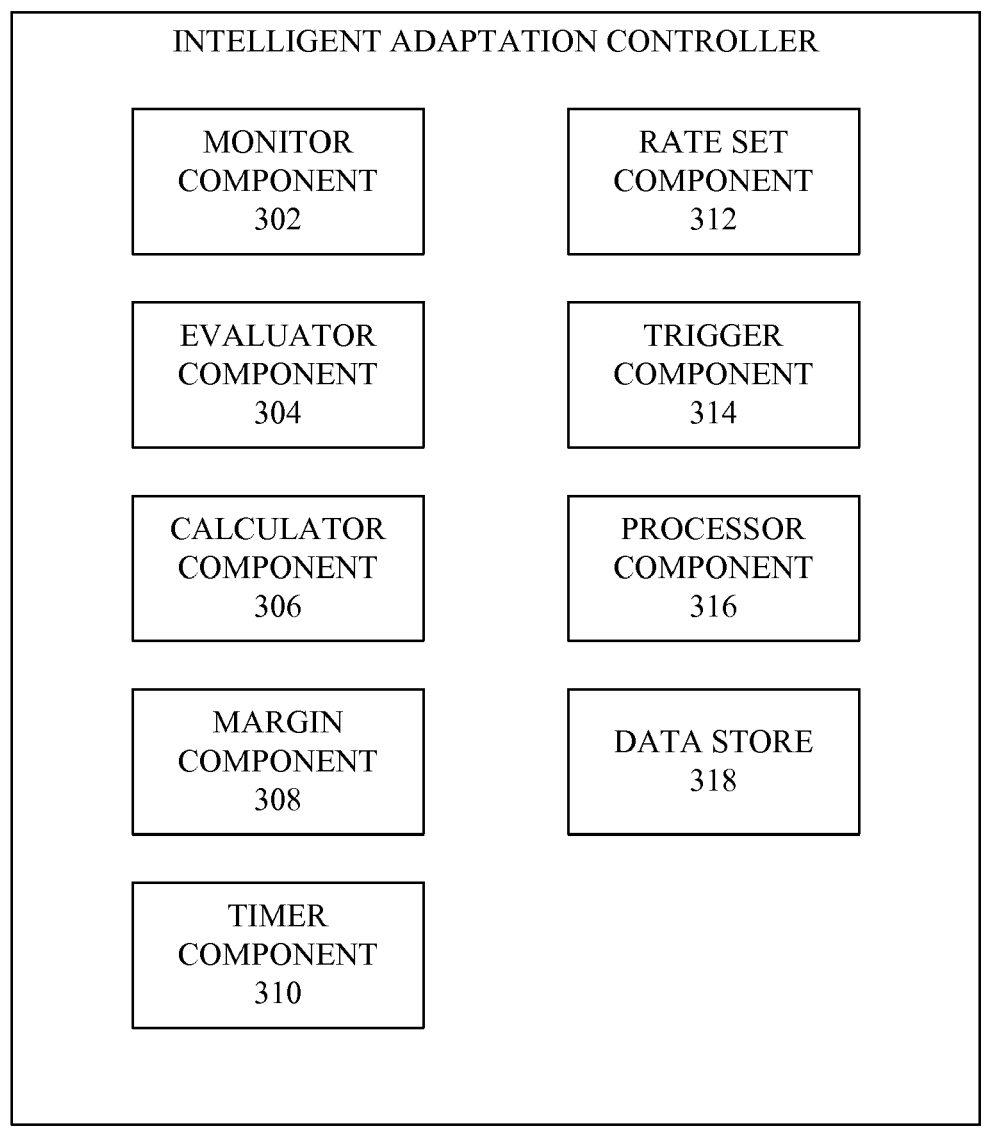
FIG. 3 depicts a block diagram of an example intelligent adaptation controller in accordance with an aspect of the disclosed subject matter.

FIG. 3 depicts a block diagram of an example intelligent adaptation controller 300 in accordance with an aspect of the disclosed subject matter. In an aspect, the intelligent adaptation controller 300 can be utilized to control rate coding associated with a UE (e.g., 102, 202) in a communication network. The intelligent adaptation controller 300 can include a monitor component 302 that can monitor, detect, and receive FB information related to communication conditions (e.g., RF conditions, QoS, etc.) associated with communication devices, such as UEs (e.g., 102, 202), in the communication network (e.g., wireless portion of the network; wire-line network, or portion thereof), and information relating to the application or service being used by the UE, where the information relating to the application or service can be received from one or more inspection components (e.g., 228, 230) employed in the network to inspect (e.g., perform DPI) data traffic communicated between a data source (e.g., 112, 218) and the UE, a data source communicating with the UE, and/or the UE.

The intelligent adaptation controller 300 also can comprise an evaluator component 304 that can evaluate the FB information related to communication conditions associated with a communication device(s), historical information relating to communication conditions associated with the UE, information relating to the user of the UE (e.g., which can be stored in a user profile), and/or the information relating to the application or service being used by a UE, based at least in part on predefined rate adaptation criteria, to facilitate determining an adapted data rate or corresponding rate coding to be employed to communicate data to the UE from the intelligent adaptation node (e.g., 114, 224). The evaluator component 304 can operate in conjunction with a calculator component 306 that can calculate a preliminary data rate, R; an adjusted preliminary data rate, $R_A$, and associated application margin, AM (e.g., $R_A = R \times AM$); and an adapted data rate, $R_{AE}$, and associated volatility margin, VM (e.g., $R_{AE} = R_A \times VM$), in accordance with the predefined rate adaptation criteria. The evaluator component 304 and calculator component 306 also can be employed to determine, predict, or infer expected values of QoS factors and communication conditions metrics associated with the UE, where such values can be utilized to facilitate adapting data rates associated with the UE and controlling (e.g., adjusting) the frequency of rate adaptations associated with the UE.

In another aspect, the intelligent adaptation controller 300 can contain a margin component 308 that can operate in conjunction with the calculator component 306 to calculate an adapted data rate (and corresponding rate coding) to be applied during an adaptation time interval to facilitate communicating data between the data source and UE. The margin component 308 can determine or provide, or be used to determine or provide, a margin amount of rate (e.g., application margin, volatility margin) to be applied to a preliminary data rate or adjusted preliminary data rate, as appropriate, to adjust (e.g., increase, decrease, maintain at a same rate) the preliminary data rate to an adjusted preliminary data rate, or to adjust the adjusted preliminary data rate to the adapted data rate, to facilitate determining the adapted data rate to be applied for data communications associated with the UE. The margin amount of rate can range from 0 to virtually any desired amount feasible for the communication network. For example, the margin amount of rate can be determined as a function of a percentage of the preliminary data rate or adjusted preliminary data rate (e.g., application margin=y %×preliminary data rate, and the adjusted preliminary data rate=preliminary data rate+application margin; and volatility margin=z %×adjusted preliminary data rate, and adapted data rate=adjusted preliminary data rate+volatility margin), or can be a specified margin amount, for example.

For instance, the particular margin (e.g., application margin, volatility margin) can be utilized to provide a "margin of safety" so that the data rate is more likely to be sufficient for data communication associated with the UE during the adaptation time interval than a lower margin amount or no margin (e.g., the data rate associated with the UE is less likely to need to be triggered to adapt to a higher data rate in order to support the data rate desired for communication with the UE). In determining the amount of margin, there can be a tradeoff between the amount of margin used, where the higher the margin amount the more network resources that are used (e.g., the higher the margin amount in the wire-line portion of the network, the more network resources that are used), and the frequency of triggered re-adaptations of the data rate for data communication associated with the UE, where the higher the frequency of triggered re-adaptations the more computations and overhead signaling traffic that occur. The amount of margin can be determined based at least in part on the predefined rate adaptation criteria, where the predefined rate adaptation criteria can account for various factors, including the tradeoff between the amount of margin utilized for the adapted data rate associated with the UE and the frequency of re-adaptation of the data rate associated with the UE.

The intelligent adaptation controller 300 also can comprise a timer component 310 that can be utilized to track time for each adaptation time interval relating to rate adaptations associated with the UE. The timer component 310 can employ respective timers that can have respective adaptation time thresholds set or adjusted, as desired, for respective UEs utilizing an application or service in the communication network. The timer can increment (or decrement, as desired) from a predefined reset value (e.g., 0) towards the adaptation time threshold, and when the adaptation time threshold of the timer is met, the timer can reset to the predefined reset value, and the intelligent adaptation controller 300 can adapt the data rate associated with the UE that is associated with that timer. In an alternative embodiment, a timer can be set or re-set to an adaptation time threshold and can decrement down to a predefined value (e.g., 0) and re-set to the applicable adaptation time threshold at that point, as desired. In another aspect, the predefined adaptation time interval can vary from adaptation time interval to adaptation time interval based at least in part on current volatility in the communication conditions associated with the UE and the predefined rate adaptation criteria. In still another aspect, the intelligent adaptation controller 300 can include a rate set component 312 that can communicate rate coding information to the intelligent adaptation node(s) to facilitate controlling or respectively adapting data rates associated with the UE at desired times (e.g., at the beginning of each adaptation time interval, or when rate adaptation is dynamically triggered).

The intelligent adaptation controller 300 further can include a trigger component 314 that can automatically and dynamically trigger adaptation of a data rate or rate coding associated with a UE, even when the adaptation time threshold has not yet been reached, based at least in part on communication conditions associated with the UE, conditions associated with the application or service used by the UE, and/or the predefined rate adaptation criteria. For instance, if the communication conditions associated with the UE change (e.g., QoS factor changes; RF conditions improve) by a predetermined threshold amount or percentage (applicable to the particular communication condition parameter) over a specified period of time or specified number of adaptation cycles, the evaluator component 304, operating in conjunction with the trigger component 314, can determine that the data rate associated with the UE is to be dynamically re-adapted, and the trigger component 314 can dynamically trigger adaptation of the data rate associated with the UE. As another example, if the data rate associated with a UE is determined and set at a particular data rate due in part to the mode of operation of the application or service being in a particular mode, and during the adaptation time interval, the mode of operation changes to a different mode, if the change of mode (or change of QoS/QoE parameters) satisfies the predefined rate adaptation criteria for dynamically triggering adaptation of the data rate, the trigger component 314 can signal to trigger re-adaptation of the data rate associated with the UE. The rate set component 312 can communicate the rate coding for the triggered adaptation to the intelligent adaptation node to facilitate dynamically adapting the data rate associated with the UE.

In another aspect, the intelligent adaptation controller 300 can comprise a processor component 316 that can work in conjunction with the other components (e.g., evaluator component 304, calculator component 306, etc.) to facilitate performing the various functions of the intelligent adaptation controller 300. The processor component 316 can employ one or more processors, microprocessors, or controllers that can process data, such as FB information regarding communication conditions associated with a UE, information relating to the application or service being used by a UE, predefined rate adaptation criteria (and corresponding rules), and/or other information, to facilitate determining adapted data rates to be utilized to communicate data to/from the UE; and can control data flow between the intelligent adaptation controller 300 and an intelligent adaptation node or other components associated with the intelligent adaptation controller 300.

The intelligent adaptation controller 300 also can include a data store 318 that can store data structures (e.g., user data, metadata); code structure(s) (e.g., modules, objects, classes, procedures) or instructions; predefined rate adaptation criteria; FB information respectively associated with UEs; current and historical information regarding communication conditions respectively associated with UEs and associated users; current and historical adaptation rates respectively associated with respective UEs; QoS/QoE information respectively associated with applications or services; information relating to margins (e.g., application margin, volatility margin), network or device information like policies and specifications, attachment protocols; code sequences for scrambling, spreading and pilot (e.g., reference signal(s)) transmission; frequency offsets; cell IDs; and so on. In an aspect, the processor component 316 can be functionally coupled (e.g., through a memory bus) to the data store 318 in order to store and retrieve information (e.g., information relating to the predefined rate adaptation criteria, algorithms used to determine rate coding or data rates, adaptation time threshold information, stored FB information, stored information relating to applications or services, stored user profile information, QoS/QoE information, etc.) desired to operate and/or confer functionality, at least in part, to monitor component 302, evaluator component 304, calculator component 306, margin component 308, timer component 310, rate set component 312, trigger component, 314, and/or substantially any other operational aspects of the intelligent adaptation controller 300.

Figure 4:
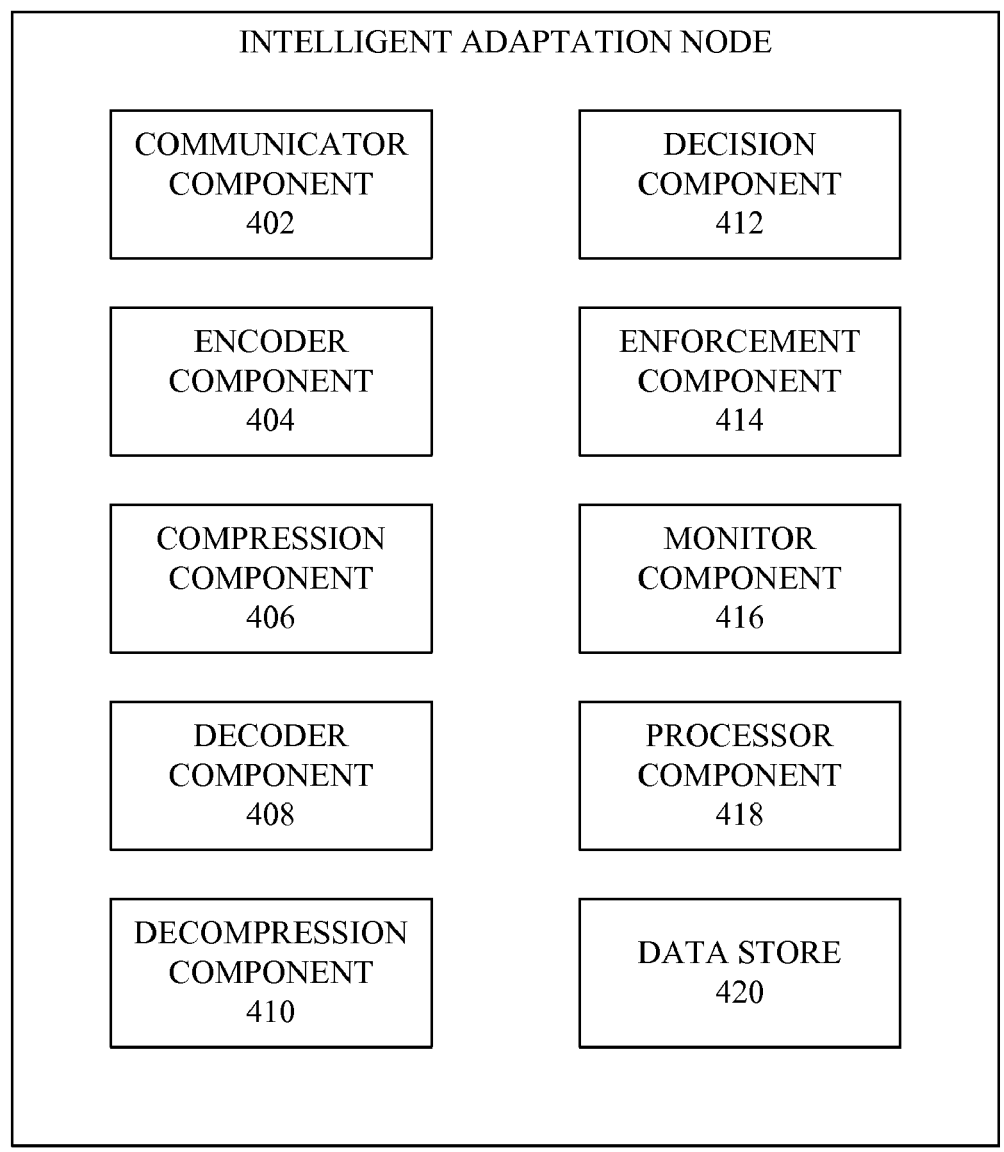
FIG. 4 illustrates a block diagram of an example intelligent adaptation node that can be utilized to facilitate adaptation of rate coding associated with a communication device in a communication network in accordance with an aspect of the disclosed subject matter.

FIG. 4 illustrates a block diagram of an example intelligent adaptation node 400 that can be utilized to facilitate adaptation of rate coding associated with a UE in a communication network in accordance with an aspect of the disclosed subject matter. In an aspect, the intelligent adaptation node 400 can include a communicator component 402 that can facilitate communication (e.g., transmission, reception) of data between the intelligent adaptation node 400 and other components, such as, for example, a base station or an intelligent adaptation controller, to facilitate adapting rate coding or data rates associated with a UE(s).

In an aspect, the intelligent adaptation node 400 can contain an encoder component 404 that can encode data in accordance with a desired encoding algorithm, and can operate in conjunction with a compression component 406 to compress data in accordance with a desired rate coding or data rate using a desired compression algorithm, where the compression can be lossless or lossy. The intelligent adaptation node 400 can contain a decoder component 408 that can decode data in accordance with a desired decoding algorithm (which can correspond to the encoding algorithm used to encode the data), and can operate in conjunction with a decompression component 410 to decompress data in accordance with a desired rate coding or data rate using a desired decompression algorithm (which can correspond with the compression algorithm employed to compress the data). For example, the intelligent adaptation node 400 can employ an encoder-decoder, such as a variable rate codec, to perform at least a portion of the functions of the encoder component 404, compression component 406, decoder component 408, or decompression component 410.

In still another aspect, the intelligent adaptation node 400 can comprise a decision component 412 (e.g., policy decision function (PDF)) that can make decisions relating to adaptation of rate coding or data rates and/or relating to other policies, such as decisions related to QoS, the rate coding or data rate to implement, parameter values to be employed with regard to encoding, decoding, compression, or decompression, or which compression algorithm or decompression algorithm to employ with regard to data traffic associated with a UE, for example, where the decisions can be made in accordance with predefined rules, such as predefined rate adaptation rules, based at least in part on the predefined rate adaptation criteria, and/or information (e.g., commands, instructions) received from the intelligent adaptation controller.

In yet another aspect, the intelligent adaptation node 400 can include an enforcement component 414 (e.g., policy enforcement function (PEF)) that can enforce decisions or implement actions based in part on decisions (e.g., policy decisions) made by the decision component 412. The decision component 412 can communicate decisions it has made or instructions related to the decisions made, and the enforcement component 414 can operate in conjunction with other components within the intelligent adaptation node 400 or other components (e.g., base station, data source, etc.) associated with the intelligent adaptation node 400. For example, the enforcement component 414 can operate in conjunction with the encoder component 404 and compression component 406 to implement an adapted data rate or rate coding to be utilized to communicate data to a UE in accordance with a decision made by the decision component 412.

In an aspect, the intelligent adaptation node 400 can comprise a monitor component 416 that can monitor, detect, and receive FB information related to communication conditions associated with a UE in the communication network and/or information relating to an application or service being used by the UE (e.g., as communicated to the intelligent adaptation node 400 by the UE). For example, the intelligent adaptation node 400 can monitor and receive FB information related to communication conditions associated with a UE connected to a base station associated with the intelligent adaptation node 400 to facilitate adapting data rates, such as the output data rate of the intelligent adaptation node 400 and the input data rate of the UE.

The intelligent adaptation node 400 also can contain a processor component 418 that can operate in conjunction with the other components (e.g., communicator component 402, encoder component 404, compression component 406, decoder component 408, decompression component 410, decision component 412, enforcement component 414, monitor component 416, etc.) to facilitate performing the various functions of the intelligent adaptation node 400. The processor component 418 can employ one or more processors, microprocessors, or controllers that can process data, such as FB information regarding communication conditions associated with a UE, predefined rate adaptation rules, information relating to rate coding to be employed for data communication associated with a UE, or other information (e.g., control or decision information relating to adapting data rates) relating to adapting data rates associated with a UE (e.g., control or decision information relating to adapting data rates), and can control data flow between the intelligent adaptation controller and the intelligent adaptation node 400 or other components associated with the intelligent adaptation node 400.

The intelligent adaptation node 400 also can contain a data store 420 that can store data structures (e.g., user data, metadata); code structure(s) (e.g., modules, objects, classes, procedures) or instructions; rate coding information for the adaptation node and/or components (e.g., UE) associated therewith); FB information regarding communication conditions associated with a UE or other component; predefined rate adaptation rules; network or device information like policies and specifications; and so on. In an aspect, the processor component 418 can be functionally coupled (e.g., through a memory bus) to the data store 420 in order to store and retrieve information (e.g., rate coding information, the FB information, predefined rate adaptation rules, encoding/decoding or compression/decompression algorithms, etc.) desired to operate and/or confer functionality, at least in part, to communicator component 402, encoder component 404, compression component 406, decoder component 408, decompression component 410, decision component 412, enforcement component 414, monitor component 416, and/or substantially any other operational aspects of the intelligent adaptation node 400. It is to be appreciated and understood that certain components, such as, for example, the decision component 412 or enforcement component 414, can reside within the intelligent adaptation node 400 (as depicted), can reside within another component, or can be stand-alone components, as desired.

Figure 5:
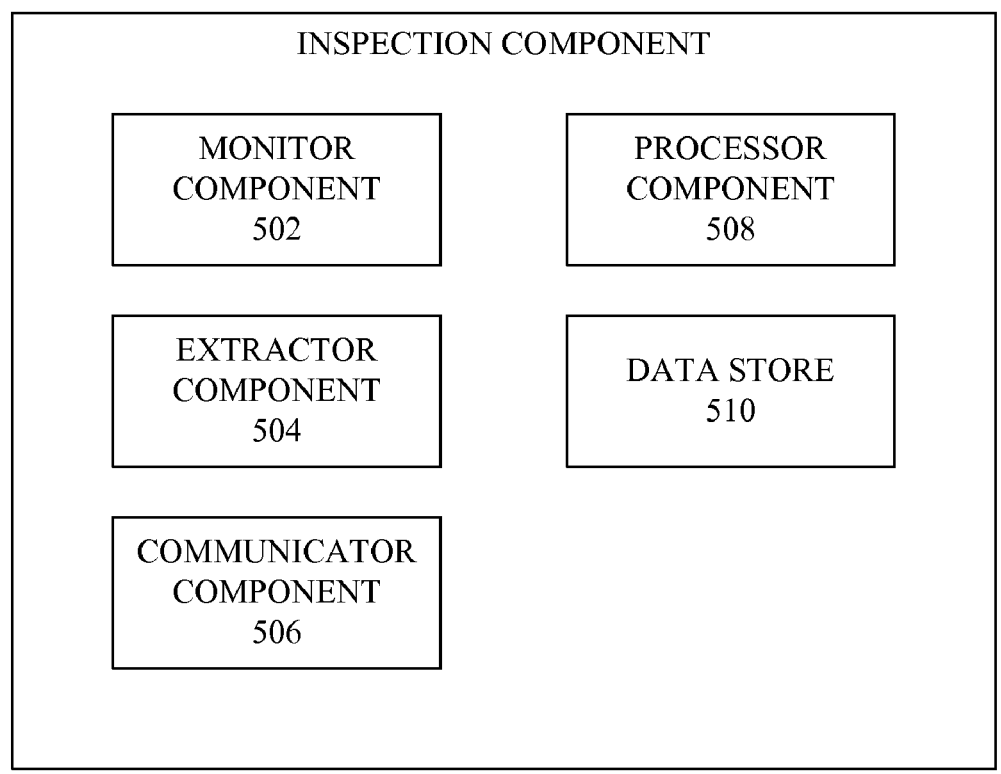
FIG. 5 depicts a block diagram of an example inspection component in accordance with an aspect of the disclosed subject matter.

FIG. 5 depicts a block diagram of an example inspection component 500 in accordance with an aspect of the disclosed subject matter. The inspection component 500 can comprise a monitor component 502 that can monitor data traffic associated with a UE when the UE is utilizing an application or service in the communication network. In an aspect, the application or service can be associated with a data source in the communication network.

In another aspect, the inspection component 500 also can include an extractor component 504 that can inspect, identify, and/or extract desired information from the data traffic associated with the UE. The extractor component 504 can perform virtually any desired level of inspection of the data traffic associated with the UE. For example, the extractor component 504 can perform DPI to inspect the header information and data payload of data traffic (e.g., data packets) associated with the UE, or can perform a lower level of inspection, such as inspection of only the header information of the data traffic associated with the UE, or can perform inspection that is deeper than the lower level of inspection but not as deep as DPI-type inspection. In accordance with various embodiments, the extractor component 504 can extract all or a desired portion of the data from the data traffic associated with the UE. For example, the extractor component 504 can extract information relating to the application or service (e.g., type of application or service, specific application or service, current mode of operation of the application or service, available modes of operation of the application or service, etc.) from the data traffic, or can extract other information as well.

In still another aspect, the inspection component 500 can contain a communicator component 506 that can communicate or transmit the extracted information to the intelligent adaptation controller. In yet another aspect, the inspection component 500 can comprise a processor component 508 that can operate in conjunction with the other components (e.g., monitor component 502, extractor component 504, communicator component 506, data store 510, etc.) to facilitate performing the various functions of the inspection component 500. The processor component 508 can employ one or more processors, microprocessors, or controllers that can process data, information relating to performing inspection of data traffic, or other information (e.g., control or decision information relating to adapting data rates) relating to inspecting data traffic associated with a UE, and can control data flow between the intelligent adaptation controller and the inspection component 500 or other components associated with the inspection component 500.

The inspection component 500 also can include a data store 510 that can store data structures (e.g., user data, metadata); code structure(s) (e.g., modules, objects, classes, procedures) or instructions; data inspection protocols or algorithms; and so on. In an aspect, the processor component 508 can be functionally coupled (e.g., through a memory bus) to the data store 510 in order to store and retrieve information (e.g., extracted information, data inspection algorithm(s), etc.) desired to operate and/or confer functionality, at least in part, to monitor component 502, extractor component 504, communicator component 506, and/or substantially any other operational aspects of the inspection component 500.

Figure 6:
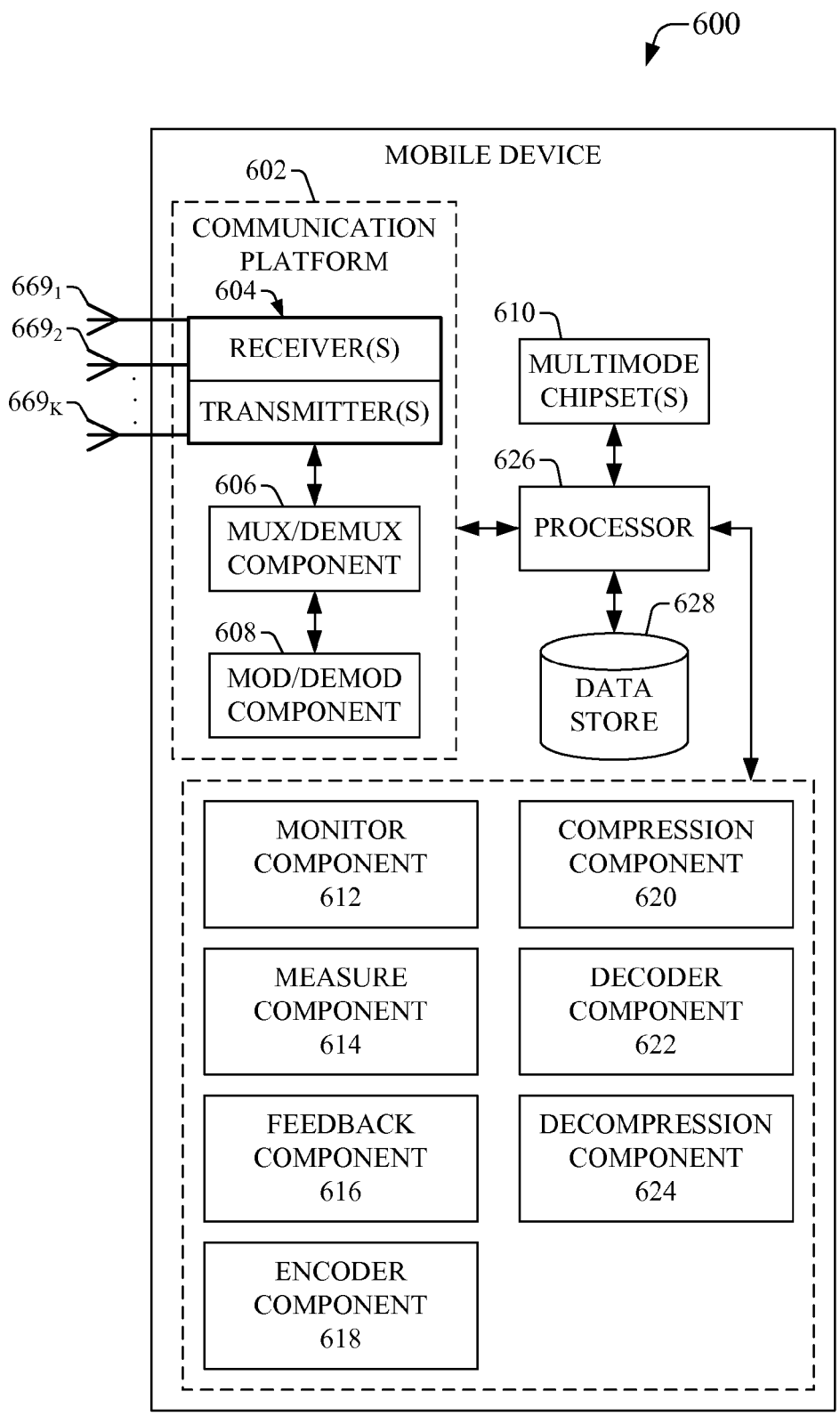
FIG. 6 depicts a block diagram of an example mobile device in accordance with an aspect of the disclosed subject matter.

FIG. 6 depicts a block diagram of an example mobile device 600 (e.g., UE) in accordance with an aspect of the disclosed subject matter. In an aspect, the mobile device 600 can be a multimode access terminal, wherein a set of antennas $669_1$-$669_Q$ (Q is a positive integer) can receive and transmit signal(s) from and to wireless devices like access points, access terminals, wireless ports and routers, and so forth, that operate in a radio access network. It should be appreciated that antennas $669_1$-$669_Q$ are a part of communication platform 602, which comprises electronic components and associated circuitry that provide for processing and manipulation of received signal(s) and signal(s) to be transmitted; e.g., receivers and transmitters 604, multiplexer/demultiplexer (mux/demux) component 606, and modulation/demodulation (mod/demod) component 608.

In another aspect, multimode operation chipset(s) 610 can allow the mobile device 600 to operate in multiple communication modes in accordance with disparate technical specification for wireless technologies. In an aspect, multimode operation chipset(s) 610 can utilize communication platform 602 in accordance with a specific mode of operation (e.g., voice, Global Positioning System (GPS)). In another aspect, multimode operation chipset(s) 610 can be scheduled to operate concurrently (e.g., when Q>1) in various modes or within a multitask paradigm.

In still another aspect, the mobile device 600 can include a monitor component 612 that can monitor and detect various parameters relating to communication conditions (e.g., RF link, bandwidth, QoS), associated with the mobile device 600. The monitor component 612 also can monitor, obtain, and/or identify mode of operation or conditions associated with the application or service used by the mobile device 600, type of application or service used, or specific application or service used by the mobile device 600. The mobile device 600 can contain a measure component 614 that can measure the amount or value of the respective parameters relating to communication conditions associated with the mobile device 600. The mobile device 600 can employ a FB component 616 that can operate in conjunction with the communication platform 602 to communicate FB information relating to the communication conditions (e.g., measured parameters) and/or other information (e.g., information relating to the application or service being used by the mobile device 600) to an intelligent adaptation node via the base station serving the mobile device 600 to facilitate adaptation of rate coding or data rate associated with the mobile device 600.

In yet another aspect, the mobile device 600 can comprise an encoder component 618 that can encode data in accordance with an encoding algorithm when it is desired to encode data (e.g., for transmission to another component or communication device), and can operate in conjunction with a compression component 620 to compress data in accordance with a desired rate coding or data rate using a desired compression algorithm when compression of data is desired, where the compression can be lossless or lossy. The mobile device 600 can contain a decoder component 622 that can decode data in accordance with an decoding algorithm (which can correspond to the encoding algorithm used to encode the data) when data (e.g., received data) is encoded, and can operate in conjunction with a decompression component 624 to decompress data in accordance with a desired rate coding or data rate using a desired decompression algorithm (which can correspond with the compression algorithm employed to compress the data) when data (e.g., received data) has been compressed. In an embodiment, an encoder-decoder (e.g., variable rate codec) can be employed and can comprise the encoder component 618, compression component 620, decoder component 622, and/or decompression component 624.

The mobile device 600 also can include a processor(s) 626 that can be configured to confer functionality, at least in part, to substantially any electronic component within the mobile device 600, in accordance with aspects of the subject innovation. As an example, the processor(s) 626 can facilitate enabling the mobile device 600 to measure communication conditions associated with the mobile device 600 and transmit FB information relating to the communication conditions to the intelligent adaptation node via the base station serving the mobile device 600. Further, the processor(s) 626 can facilitate enabling the mobile device 600 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc.

The mobile device 600 also can contain a data store 628 that can store data structures (e.g., user data, metadata); code structure(s) (e.g., modules, objects, classes, procedures) or instructions; FB information relating to communication conditions associated with the mobile device 600; rate coding information associated with the mobile device 600; encoding algorithms; compression algorithms; decoding algorithms; decompression algorithms; network or device information like policies and specifications, attachment protocols; code sequences for scrambling, spreading and pilot (e.g., reference signal(s)) transmission; frequency offsets; cell IDs; and so on. In an aspect, the processor(s) 626 can be functionally coupled (e.g., through a memory bus) to the data store 628 in order to store and retrieve information (e.g., rate coding information, FB information, etc.) desired to operate and/or confer functionality, at least in part, to communication platform 602, multimode operation chipset(s) 610, monitor component 612, measure component 614, FB component 616, encoder 618, compression component 620, decoder 622, decompression 624, and/or substantially any other operational aspects of the mobile device 600.

Figure 7:
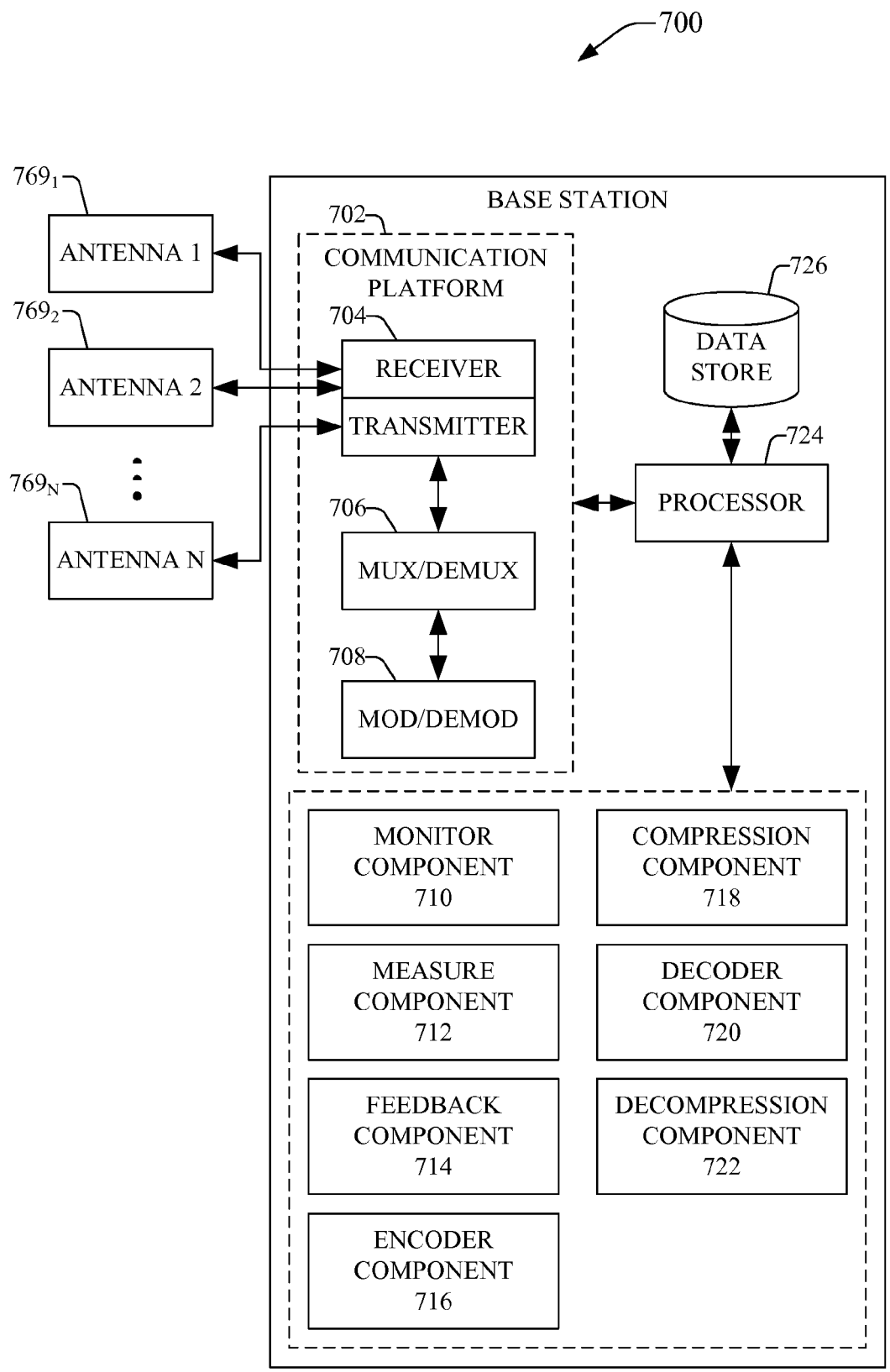
FIG. 7 illustrates a block diagram of an example base station in accordance with an aspect of the disclosed subject matter.

FIG. 7 illustrates a block diagram of an example base station 700 in accordance with an aspect of the disclosed subject matter. The base station 700 can receive and transmit signal(s) from and to wireless devices like access points (e.g., base stations, femto access points), access terminals, wireless ports and routers, and the like, through a set of antennas $769_1$-$769_N$. It should be appreciated that while antennas $769_1$-$769_N$ are a part of a communication platform 702, which comprises electronic components and associated circuitry that can provide for processing and manipulation of received signal(s) and signal(s) to be transmitted. In an aspect, the communication platform 702 can include a receiver/transmitter 704 that can convert signal from analog to digital upon reception, and from digital to analog upon transmission. In addition, receiver/transmitter 704 can divide a single data stream into multiple, parallel data streams, or perform the reciprocal operation.

In an aspect, coupled to receiver/transmitter 704 can be a multiplexer/demultiplexer (mux/demux) 706 that can facilitate manipulation of signal in time and frequency space. The mux/demux 706 can multiplex information (e.g., data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 706 can scramble and spread information (e.g., codes) according to substantially any code known in the art, e.g., Hadamard-Walsh codes, Baker codes, Kasami codes, polyphase codes, and so on. A modulator/demodulator (mod/demod) 708 also can be part of an operational group, and can modulate information according to multiple modulation techniques, such as frequency modulation, amplitude modulation (e.g., M-ary quadrature amplitude modulation (QAM), with M a positive integer), phase-shift keying (PSK), and the like.

In still another aspect, the base station 700 can include a monitor component 710 that can monitor and detect various parameters relating to communication conditions (e.g., RF link, bandwidth, QoS), associated with a mobile device being served by the base station 700, and also can monitor and receive information relating to communication conditions associated with a mobile device that has been transmitted from the mobile device to the base station 700. The base station 700 also can contain a measure component 712 that can measure the amount or value of the respective parameters relating to communication conditions associated with the served mobile device. The base station 700 can employ a FB component 614 that can operate in conjunction with the communication platform 702 to communicate FB information relating to the communication conditions (e.g., measured parameters) to an intelligent adaptation node associated with the base station to facilitate adaptation of rate coding or data rate associated with a mobile device(s) being served by the base station 700.

In yet another aspect, the base station 700 can comprise an encoder 716 that can encode data in accordance with an encoding algorithm when it is desired to encode data, and can operate in conjunction with a compression component 718 to compress data in accordance with a desired rate coding or data rate using a desired compression algorithm when it is desired to compress data, where the compression can be lossless or lossy. The base station 700 can contain a decoder 720 that can decode data in accordance with an decoding algorithm (which can correspond to the encoding algorithm used to encode the data) when data (e.g., received data) has been encoded, and can operate in conjunction with a decompression component 722 to decompress data in accordance with a desired rate coding or data rate using a desired decompression algorithm (which can correspond with the compression algorithm employed to compress the data) when data (e.g., received data) has been compressed.

The base station 700 also can comprise a processor(s) 724 configured to confer and/or facilitate providing functionality, at least partially, to substantially any electronic component in or associated with the base station 700. For instance, the processor(s) 724 can facilitate enabling the monitor component 710 to monitor, detect, or receive information relating to communication conditions associated with the served mobile device, and the FB component 714 to communicate FB information relating to the communication conditions to the intelligent adaptation node. In addition, the processor(s) 724 can facilitate operations on data (e.g., symbols, bits, or chips) for multiplexing/demultiplexing, such as effecting direct and inverse fast Fourier transforms, selection of modulation rates, selection of data packet formats, inter-packet times, etc.

In another aspect, the base station 700 can include a data store 726 that can store data structures; code instructions; FB information relating to communication conditions associated with the mobile device served by the base station 700; rate coding information associated with the served mobile device; system or device information like policies and specifications; code sequences for scrambling; spreading and pilot transmission; floor plan configuration; access point deployment and frequency plans; scheduling policies; and so on. The processor(s) 724 can be coupled to the data store 726 in order to store and retrieve information (e.g., rate coding information, the FB information, etc.) desired to operate and/or confer functionality to the communication platform 702, receiver/transmitter 704, mux/demux component 706, mod/demod 708, monitor component 710, measure component 712, FB component 714, encoder component 716, compression component 718, decoder component 720, decompression component 722, and/or other operational components of base station 700.

In view of the example systems described herein, example methodologies that can be implemented in accordance with the disclosed subject matter can be better appreciated with reference to flowcharts in FIGS. 8-14. For purposes of simplicity of explanation, example methodologies disclosed herein are presented and described as a series of acts; however, it is to be understood and appreciated that the claimed subject matter is not limited by the order of acts, as some acts may occur in different orders and/or concurrently with other acts from that shown and described herein. For example, a methodology disclosed herein could alternatively be represented as a series of interrelated states or events, such as in a state diagram. Moreover, interaction diagram(s) may represent methodologies in accordance with the disclosed subject matter when disparate entities enact disparate portions of the methodologies. Furthermore, not all illustrated acts may be required to implement a methodology in accordance with the subject specification. It should be further appreciated that the methodologies disclosed throughout the subject specification are capable of being stored on an article of manufacture to facilitate transporting and transferring such methodologies to computers for execution by a processor or for storage in a memory.

Figure 8:
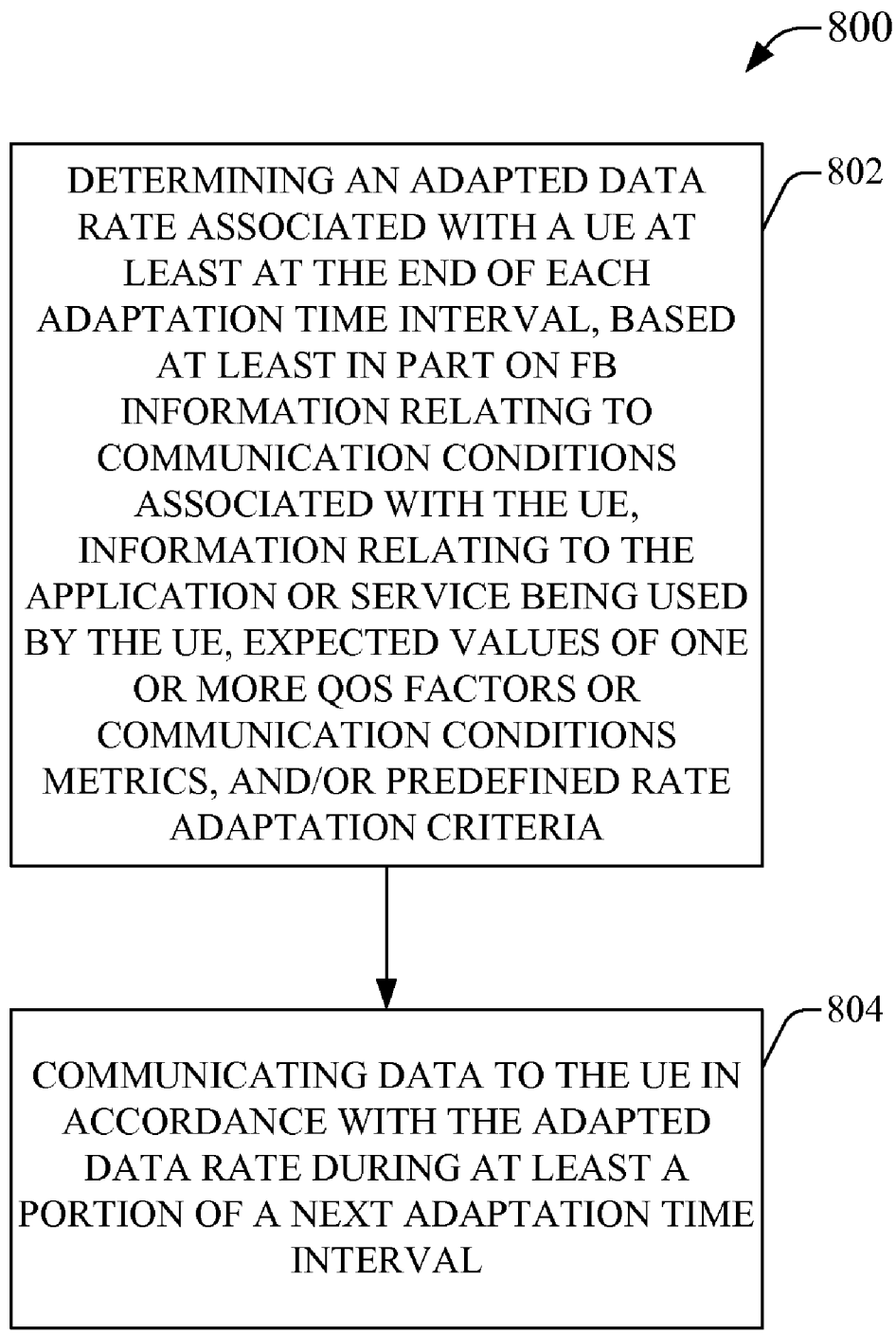
FIG. 8 illustrates a flowchart of an example methodology for controlling data rates or rate codings associated with a communication device in a communication network in accordance with various aspects of the disclosed subject matter.

FIG. 8 presents a flowchart of an example methodology 800 for controlling data rates or rate codings associated with a communication device (e.g., UE) in a communication network in accordance with various aspects of the disclosed subject matter. At 802, an adapted data rate associated with a UE can be determined at least at the end of each adaptation time interval, based at least in part on FB information relating to communication conditions associated with the UE, information relating to the application or service being used by the UE, expected values of one or more QoS factors or communication conditions metrics (e.g., RF conditions metrics), and/or predefined rate adaptation criteria, to facilitate communicating data between a data source and the UE. In an aspect, when an application or service is initiated to communicate data between the data source and UE, an intelligent adaptation controller can receive the FB information relating to the communication conditions (e.g., RF link, bandwidth, QoS, etc.) associated with the UE and can determine an initial or a default data rate, which can be used as the adapted data rate during the initial adaptation time interval. The intelligent adaptation controller also can set a predefined adaptation time threshold for a timer, which can track time until the predefined adaptation time threshold is reached, which can periodically trigger adaptation of the data rate associated with the UE. At the end of the adaptation time interval, the timer can be reset to a predefined initial value, and the timer can again track time until the predefined adaptation time threshold is reached to trigger a periodic rate adaptation, where the predefined adaptation time threshold can vary from adaptation time interval to adaptation time interval depending in part on the current volatility of communication conditions associated with the UE.

In another aspect, during a current adaptation time interval, the intelligent adaptation controller can receive the FB information relating to the communication conditions (e.g., RF link, bandwidth, QoS, etc.) associated with the UE and information relating to the application or service being used by the UE (e.g., type of application or service, specific application or service, current mode of operation of the application or service, etc.). The intelligent adaptation controller also can access historical information regarding communication conditions associated with the UE, relevant QoS and QoE information, and predefined rate adaptation rules (e.g., in accordance with the predefined rate adaptation criteria).

As desired, at the end, near the end, or just after the end of an adaptation time interval, the intelligent adaptation controller (e.g., 110) can use the information relating to the current communication conditions associated with the UE to determine a preliminary data rate, R. The intelligent adaptation controller can determine an application margin (or alternatively a service margin, when a service is utilized) based at least in part on the information relating to the application or service and the relevant QoS/QoE information and in accordance with the predefined rate adaptation criteria (e.g., and associated rules). The preliminary data rate, R, can be adjusted (e.g., increased, decreased, maintained at a same rate) by the application (or service) margin to obtain an adjusted preliminary data rate, $R_A$. In another aspect, the intelligent adaptation controller can further adjust the adjusted preliminary data rate, $R_A$, based at least in part on the historical information relating to communication conditions associated with the UE, information relating to the user of the UE (e.g., stored in a user profile), and relevant QoS/QoE information and in accordance with the predefined rate adaptation criteria, where such information can be utilized to predict expected values of QoS factors and communication conditions metrics for the UE and to determine a volatility margin, which can be applied to the adjusted preliminary data rate, $R_A$, to obtain the adapted data rate, $R_{AE}$.

At 804, data can be communicated to the UE in accordance with the adapted data rate during at least a portion of a next adaptation time interval. In an aspect, the intelligent adaptation controller can facilitate setting the data rate associated with the UE to the adapted data rate for each adaptation time interval (or when rate adaptation is dynamically triggered as more fully disclosed herein). Data can be communicated to the UE in accordance with the adapted data rate. For instance, the data can be communicated from a data source via a source coder component at a specified data rate, which can be the same as or different than the adapted data rate for a given adaptation time interval. The intelligent adaptation controller can transmit information relating to the adapted data rate (e.g., adapted rate coding information) and specified data rate to the intelligent adaptation node. For each adaptation time interval (or when rate adaptation is dynamically triggered as more fully disclosed herein), the intelligent adaptation node can receive the information relating to the adapted data rate and the specified data rate (e.g., where the specified data rate also can be another adapted data rate in a multi-tier network) and can utilize such information to set its input data rate in accordance with the specified data rate and its output data rate in accordance with the adapted data rate. The intelligent adaptation node also can transmit at least a portion of the information relating to the adapted data rate to the UE via the serving base station, and the UE can set its input data rate in accordance with the adapted data rate. During the current adaptation time interval, the data, originally from the data source, can be communicated to the UE from the intelligent adaptation node via the serving base station at the adapted data rate. The adapted data rate can be re-determined or re-adapted for each adaptation time interval (or when rate adaptation is dynamically triggered as more fully disclosed herein).

Figure 9:
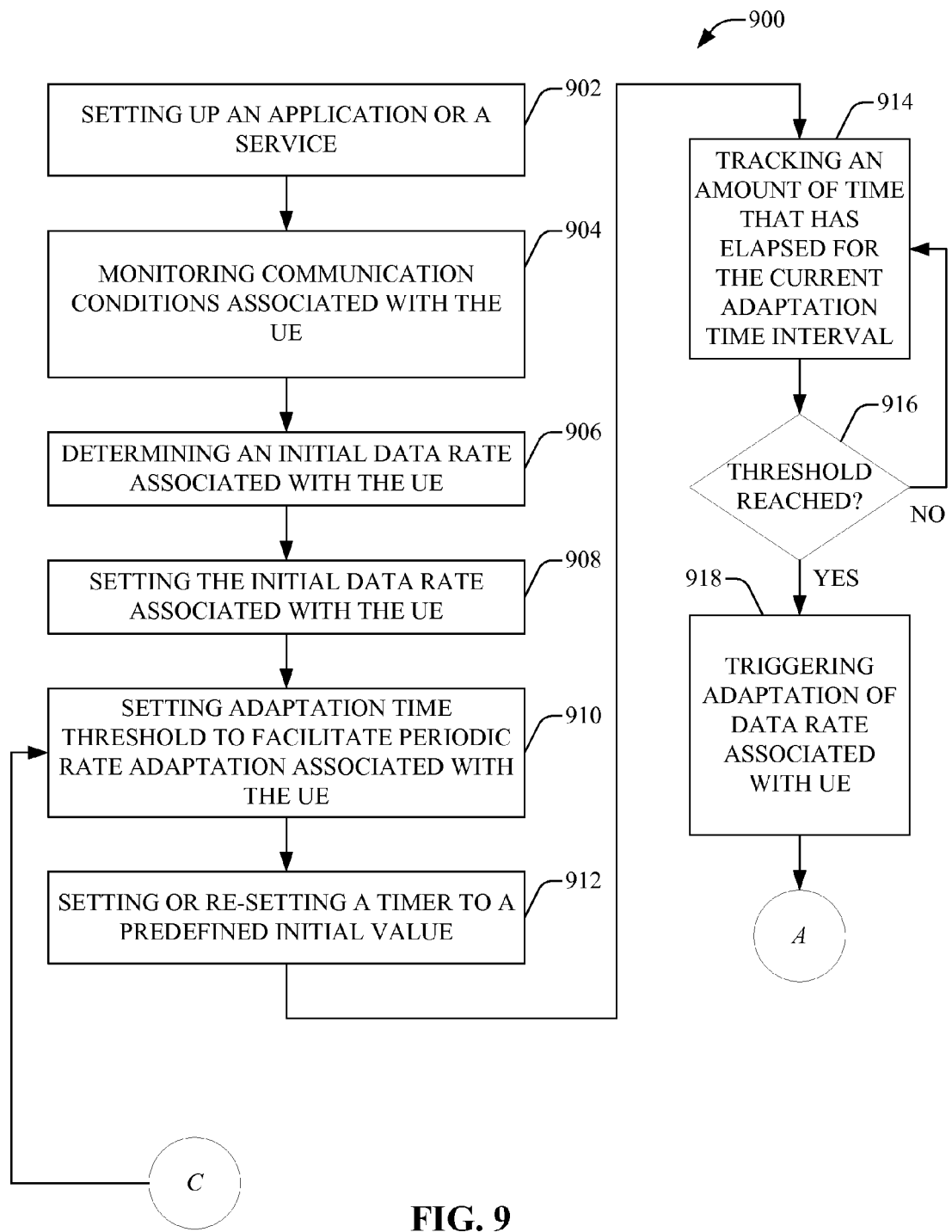
FIG. 9 depicts a flowchart of an example methodology that can facilitate adapting data rates or rate codings associated with a communication device in a communication network in accordance with an aspect of the disclosed subject matter.

FIG. 9 depicts a flowchart of an example methodology 900 that can facilitate adapting data rates or rate codings associated with a communication device (e.g., UE) in a communication network in accordance with an aspect of the disclosed subject matter. At 902, an application or a service can be set up. For example, the application or service can be set up for the UE in response to a request for the application or service. At 904, communication conditions associated with the UE can be monitored. In an aspect, the intelligent adaptation controller can monitor for information relating to the communication conditions (e.g., RF link conditions) and QoS associated with the UE, where the UE and/or serving base station can monitor, measure, and/or obtain information relating to the communication conditions associated with the UE, and such information can be communicated to the intelligent adaptation controller via the intelligent adaptation node associated therewith.

At 906, an initial data rate associated with the UE can be determined (e.g., calculated) based at least in part on FB information relating to communication conditions associated with the UE. In an aspect, when the application or service is set up, the intelligent adaptation controller can determine an initial data rate to be utilized for communicating data to the UE based at least in part on the FB information relating to communication conditions associated with the UE.

At 908, an initial data rate can be set. In an aspect, the initial data rate associated with the UE can be set to the determined data rate at set up of the application or service. For example, the output data rate for the intelligent adaptation node associated with the UE can be set to the desired initial data rate, and its input data rate can be set to a specified data rate in accordance with the output data rate of the source coder component associated with the data source related to the application or service used by the UE; and the input data rate for the UE can be set to the desired initial data rate.

At 910, an adaptation time threshold can be set to facilitate periodic rate adaptation associated with the UE. In an aspect, the intelligent adaptation controller can set the adaptation time threshold to a predefined value, where the predefined value can vary from adaptation time interval to adaptation time interval, as desired, and can be determined based at least in part on current volatility of communication conditions associated with the UE. At 912, a timer, which can be utilized to track the amount of time that has elapsed for an adaptation time interval, can be set or re-set to a predefined initial value (e.g., 0). The intelligent adaptation controller 110 can comprise or be associated with the timer. The timer initially can be set to the predefined reset value and can adjust (e.g., increment, decrement) from that point until the adaptation time threshold is reached, where rate adaptation can be performed to adapt the data rate associated with the UE when the adaptation time threshold is reached, and the timer can be re-set to the predefined reset value.

At 914, an amount of time that has elapsed for the current adaptation time interval can be tracked. In an aspect, the timer can track the amount of time that has elapsed to facilitate determining whether the predefined adaptation time threshold has been reached. At 916, a determination can be made regarding whether the predefined adaptation time threshold has been reached. If it is determined that the predefined adaptation time threshold has not been reached, methodology 900 can return to reference numeral 914, where the amount of time that has elapsed for the current adaptation time interval can continue to be tracked. If, at 916, it is determined that the predefined adaptation time threshold has been reached, at 918, periodic rate adaptation of the data rate associated with the UE can be triggered, and methodology 900 can proceed to reference point A, where intelligent rate adaptation can continue to be performed as more fully described with regard to FIG. 10 and methodology 1000, and FIG. 11 and methodology 1100.

Figure 10:
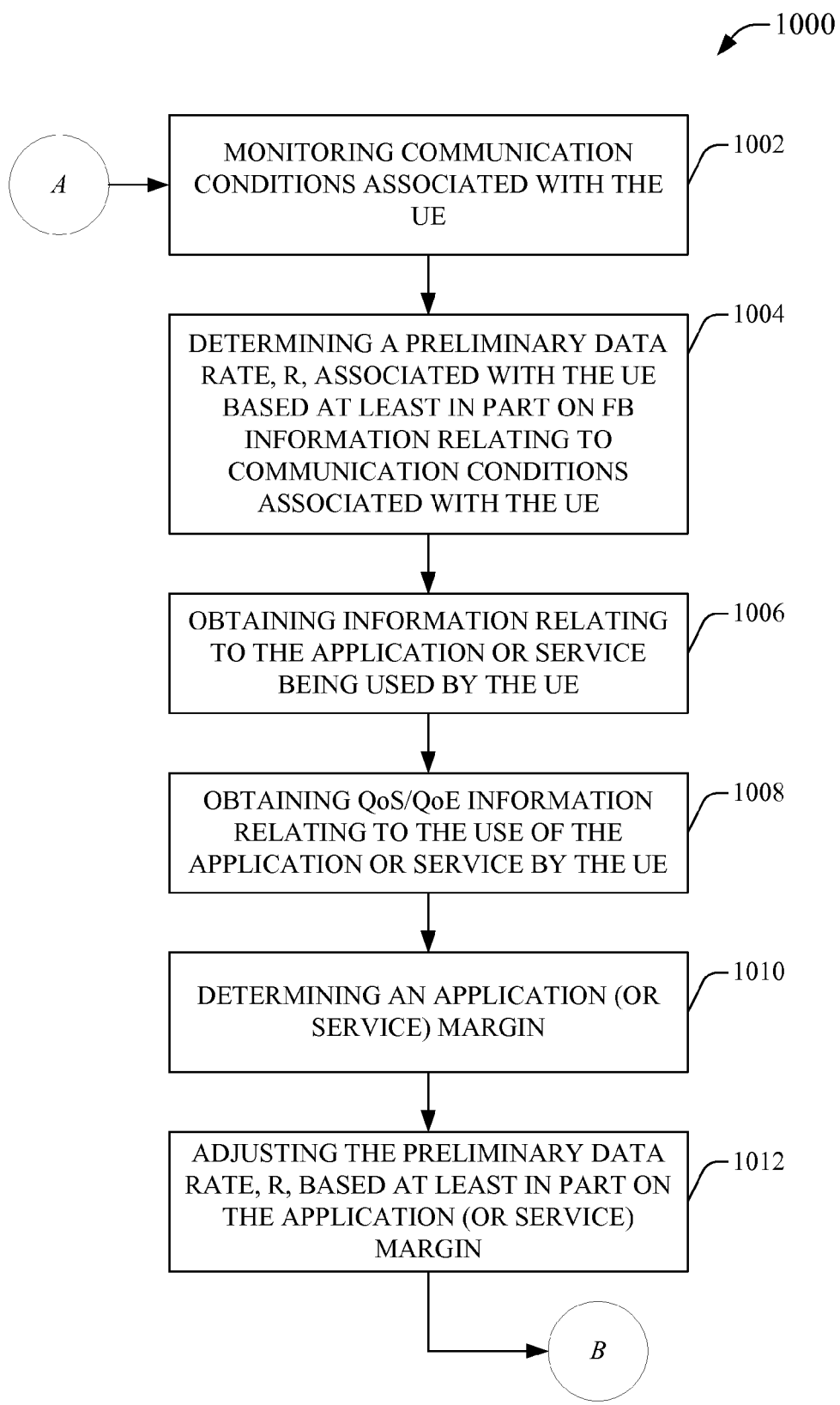
FIG. 10 illustrates a flowchart of an example methodology that can use information relating to an application or a service used by a communication device to facilitate adjusting a preliminary data rate during periodic adaptation of rate codings or data rates associated with the communication device in a communication network in accordance with an aspect of the disclosed subject matter.

FIG. 10 illustrates a flowchart of an example methodology 1000 that can use information relating to an application or a service used by a UE to facilitate adjusting a preliminary data rate during periodic adaptation of rate codings or data rates associated with a UE in a communication network in accordance with an aspect of the disclosed subject matter. In an aspect, the methodology 1000 can proceed from reference point A, from where methodology 900 left off. At 1002, communication conditions associated with the UE can be monitored. In an aspect, the intelligent adaptation controller can monitor for information relating to the communication conditions (e.g., RF link conditions, QoS) associated with the UE, where the UE and/or serving base station can monitor, measure, and/or obtain information relating to the communication conditions associated with the UE, and such information can be communicated to the intelligent adaptation controller via the intelligent adaptation node associated therewith.

At 1004, a preliminary data rate, R, associated with the UE can be determined (e.g., calculated) based at least in part on FB information relating to communication conditions associated with the UE. In an aspect, the intelligent adaptation controller can determine the preliminary data rate, R, which can be based at least in part on the FB information relating to communication conditions associated with the UE and can be utilized as a basis for determining the adapted data rate to be used for the next adaptation time interval.

At 1006, information relating to the application or service being used by the UE can be obtained. In an aspect, the intelligent adaptation controller can obtain (e.g., receive) information relating to the application or service from one or more inspection components in the communication network. The application or service related information can comprise, for example, the type of application or service, specific application or service being used by the UE, current mode of operation of the application or service, etc. At 1008, QoS/QoE information, which relates to the use of the application or service by the UE, can be obtained. In an aspect, the intelligent adaptation controller can obtain or retrieve relevant QoS/QoE information, where such information can comprise, for example, predefined rate adaptation rules and information regarding desired QoS/QoE (e.g., QoS/QoE needs or limits).

At 1010, the application (or service) margin can be determined. In an aspect, the intelligent adaptation controller can evaluate the information relating to the application or service and the FB information and apply the predefined rate adaptation rules and other relevant QoS/QoE information to such information to facilitate determining an application margin (or service margin) that can be applied to the preliminary data rate, R, to take into account the application or service being used and its current mode of operation when determining an adapted data rate to be utilized for data communications associated with the UE during the next adaptation time interval. The application margin (or service margin) can be a calculated percentage of the preliminary data rate or a calculated amount of rate, for example.

At 1012, the preliminary data rate, R, can be adjusted, based at least in part on the application (or service) margin. In an aspect, the intelligent adaptation controller or can apply the application (or service) margin to the preliminary data rate, R, to obtain an adjusted preliminary data rate, $R_A$. For example, the adjusted preliminary data rate, $R_A$, can be determined as $R_A=R\times$(application or service margin) (e.g., when the application or service margin is a percentage value) or $R_A=R+$(application or service margin) (e.g., when the application or service margin is a specified amount of rate, where the margin can be a positive or negative value, or can be zero). At this point, methodology 1000 can proceed to reference point B, where the adjusted preliminary data rate, $R_A$, associated with the UE can be further adjusted based at least in part on expected values of QoS factors and communication condition metrics, to facilitate determining an adapted data rate to be employed for communications associated with the UE during the next adaptation time interval.

Figure 11:
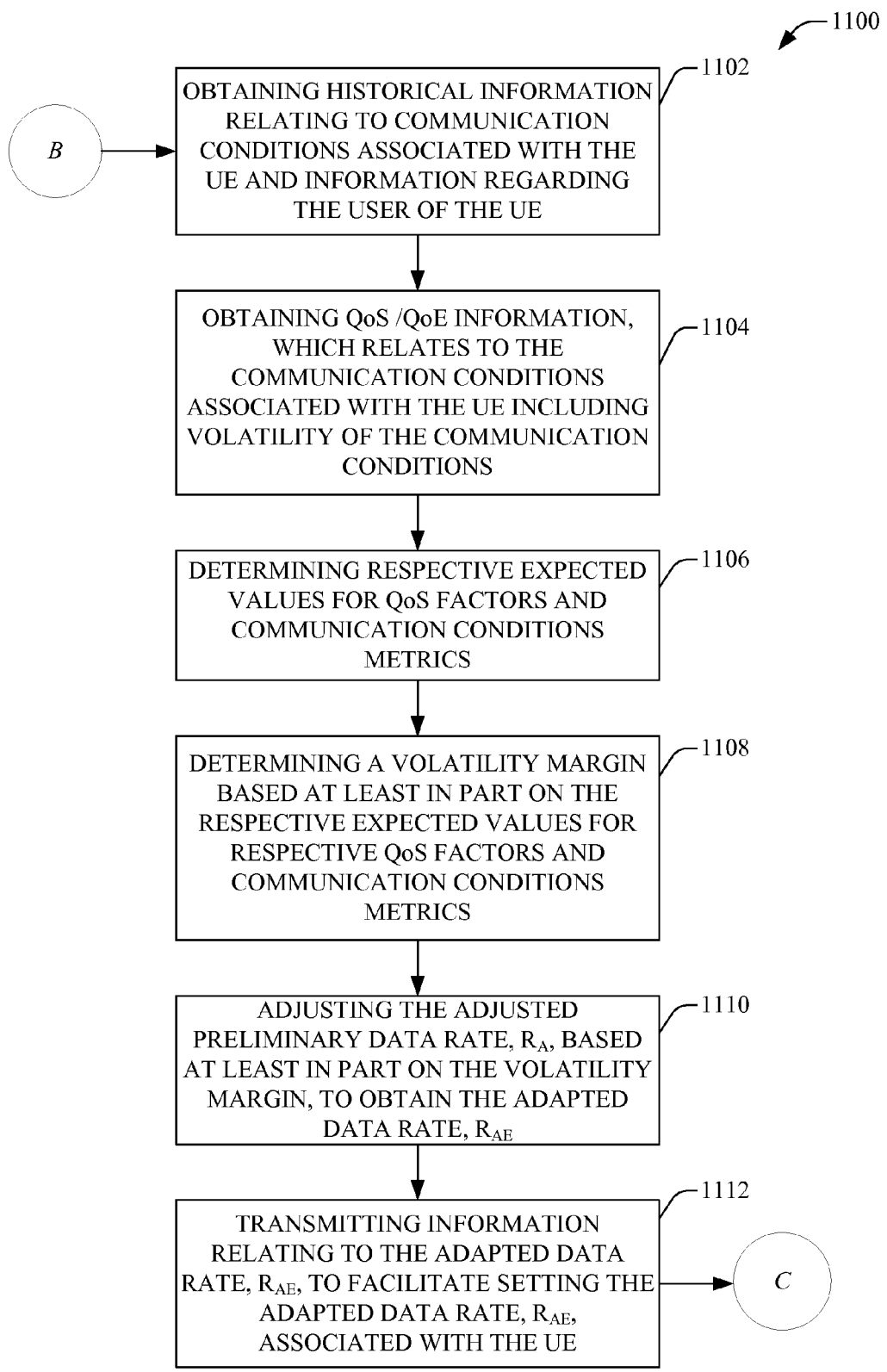
FIG. 11 depicts a flowchart of an example methodology that can that can determine and utilize expected values of Quality of Service factors and communication condition metrics to facilitate determining an adapted data rate or rate coding associated with a communication device in a communication network in accordance with an aspect of the disclosed subject matter.

FIG. 11 depicts a flowchart of an example methodology 1100 that can determine and utilize expected values of QoS factors and communication condition metrics to facilitate determining an adapted data rate or rate coding associated with a UE in a communication network in accordance with an aspect of the disclosed subject matter. In an aspect, the methodology 1100 can proceed from reference point B, from where methodology 1000 left off.

At 1102, historical information relating to communication conditions (e.g., RF conditions) associated with the UE and information regarding the user of the UE can be obtained. In an aspect, information relating to communication conditions associated with the UE and associated user can be monitored and tracked over time and this information can be stored in a data store. When adapting the data rate associated with the UE for a next adaptation time interval, the intelligent adaptation controller can obtain or retrieve the historical information relating to communication conditions associated with the UE and information relating to the user of the UE from the data store (e.g., user information can be stored in a user profile in the data store).

At 1104, QoS/QoE information, which relates to the communication conditions associated with the UE including volatility of the communication conditions, can be obtained. In an aspect, the intelligent adaptation controller can obtain or retrieve the relevant QoS/QoE information, where such information can comprise, for example, predefined rate adaptation rules and information regarding desired QoS/QoE (e.g., QoS/QoE needs or limits).

At 1106, respective expected values can be determined for QoS factors and communication conditions metrics. In an aspect, the intelligent adaptation controller can evaluate the historical information relating to the communication conditions associated with the UE, information relating to the user of the UE, and the relevant QoS/QoE information to determine or predict respective expected values for respective QoS factors and communication conditions metrics. For instance, one or more relevant predefined rate adaptation rules can be applied to the historical communication conditions information, user information, and QoS/QoE information to facilitate determining the respective expected values for respective QoS factors and communication conditions metrics.

At 1108, a volatility margin can be determined based at least in part on the respective expected values for respective QoS factors and communication conditions metrics. In an aspect, the intelligent adaptation controller can determine the volatility margin, VM, as a function of the expected values for respective QoS factors and communication conditions metrics.

At 1110, the adjusted preliminary data rate, $R_A$, can be adjusted based at least in part on the volatility margin, VM, to obtain the adapted data rate. In accordance with an aspect, the intelligent adaptation controller can apply the volatility margin, VM, to the adjusted preliminary data rate, $R_A$, to adjust (e.g., increase or decrease, or maintain with no adjustment) the adjusted preliminary data rate, $R_A$, to obtain the desired adapted data rate, $R_{AE}$, which can be used for data communications associated with the UE while using the application or service during the next adaptation time interval. For example, the VM can be a percentage value applied to the adjusted preliminary data rate, $R_A$, or a specified amount of rate applied to the adjusted preliminary data rate, $R_A$, to adjust the adjusted preliminary data rate, $R_A$, and obtain the desired adapted data rate, $R_{AE}$ (e.g., the adapted data rate, $R_{AE}$, can be determined as $R_{AE}=R_A \times$(volatility margin) (e.g., when the volatility margin is a percentage value) or $R_{AE}=R_A+$(volatility margin) (e.g., when the volatility margin is a specified amount of rate, where the margin can be a positive or negative value, or can be zero).

At 1112, information relating to the adapted data rate, $R_{AE}$, can be transmitted, for example, to the intelligent adaptation node and UE. In one aspect, the intelligent adaptation controller can transmit information relating to the desired adapted data rate (e.g., rate coding information that corresponds to the desired adapted data rate) to the intelligent adaptation node to facilitate setting the output data rate of the intelligent adaptation node to the desired adapted data rate and setting the input data rate of the UE to the desired adapted data rate for the next adaptation time interval. The intelligent adaptation node can analyze the information relating to the desired adapted rate and can set its output data rate to the desired adapted data rate. The intelligent adaptation node also can communicate at least a portion of the information relating to the desired adapted data rate to the UE, and the UE can analyze such information and can set its input data rate to the desired adapted data rate based at least in part on such information. At this point, methodology 1100 can proceed to reference point C. At this point, the subject innovation can return to methodology 900 and can proceed from reference point C to reference numeral 910, where an adaptation time threshold can be set to a desired value to facilitate periodic rate adaptation associated with the UE, and methodology 900 can proceed from that point.

It is to be appreciated and understood that, as desired, the adapted data rate can be determined by determining the preliminary data rate and adjusting the preliminary data rate by only an application or service margin (e.g., using methodology 900 and methodology 1000); determining the preliminary data rate and adjusting the preliminary data rate by only a volatility margin (e.g., using methodology 900 and methodology 1100, and by passing methodology 1000); or determining the preliminary data rate and adjusting the preliminary data rate by an application or service margin to obtain an adjusted preliminary data rate, and adjusting the adjusted preliminary data rate by a volatility margin to obtain the adapted data rate (e.g., using methodology 900, methodology 1000, and methodology 1100).

Figure 12:
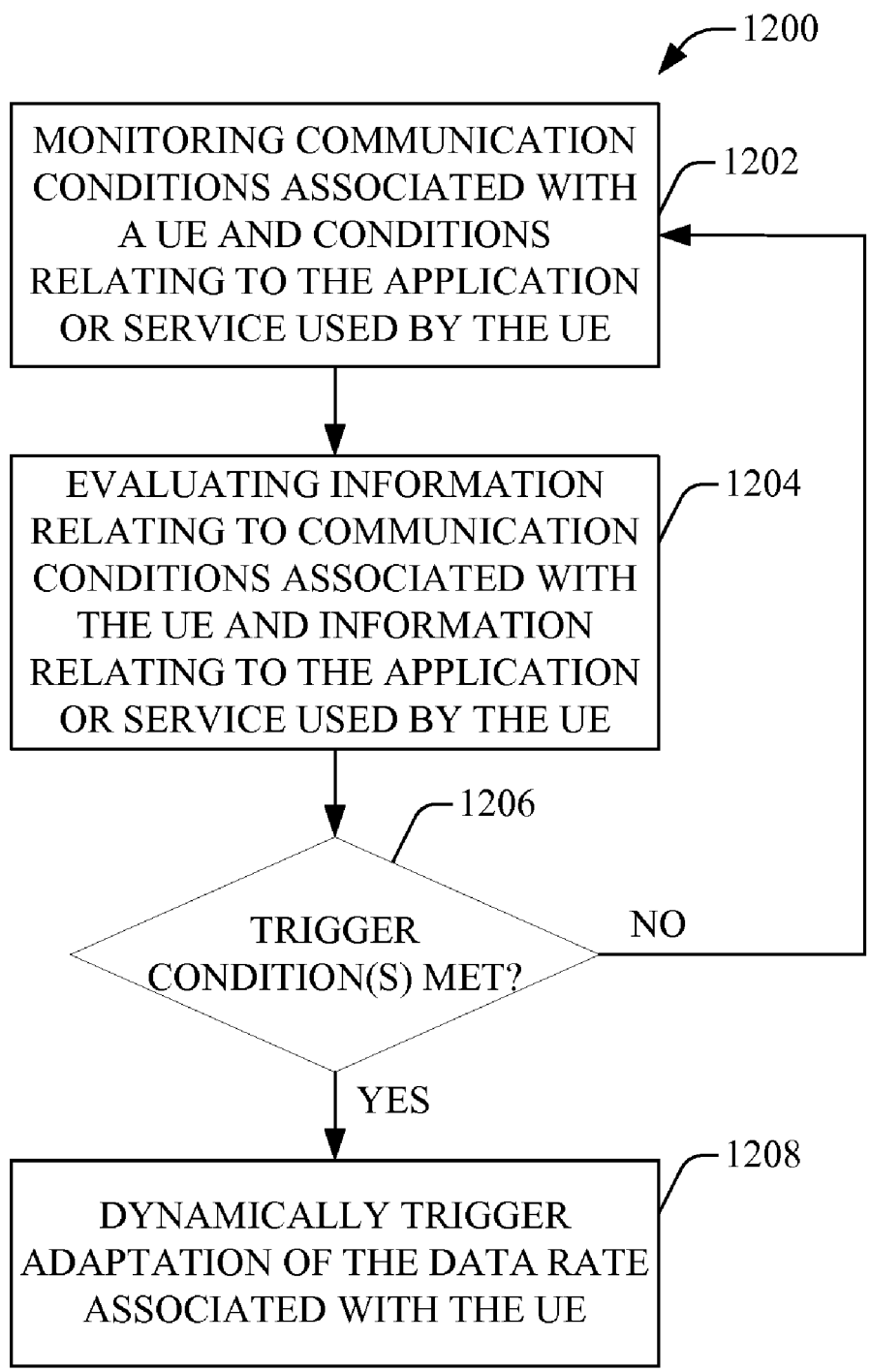
FIG. 12 depicts a flowchart of an example methodology that can dynamically trigger adapting a data rate associated with communication device in a communication network in accordance with an aspect of the disclosed subject matter.

FIG. 12 depicts a flowchart of an example methodology 1200 that can dynamically trigger adapting a data rate associated with UE in a communication network in accordance with an aspect of the disclosed subject matter. At 1202, communication conditions associated with a UE and conditions relating to the application or service used by the UE can be monitored. In an aspect, when the UE accesses an application or a service in the communication network, the UE and/or a base station serving the UE can detect or monitor communication conditions (e.g., RF link, bandwidth, QoS, ...) associated with the UE during each adaptation time interval while the UE is utilizing the application or service. The intelligent adaptation controller can monitor or detect FB information relating to the communication conditions associated with the UE, and that FB information can be received by the intelligent adaptation controller via an intelligent adaptation node connected to the intelligent adaptation controller and associated with the base station serving the UE. The intelligent adaptation controller also can monitor and receive information relating to the conditions associated with the application or service being used by the UE, where the conditions can relate to the current mode of operation of the application or service, a change in the mode of operation of the application or service, etc.

At 1204, the information relating to communication conditions associated with the UE and information relating to the application or service used by the UE can be evaluated. The intelligent adaptation controller can evaluate the information relating to communication conditions associated with the UE and information relating to the application or service used by the UE, in part by applying predefined rate adaptation criteria, including relevant predefined rate adaptation rules, and evaluating such information against such criteria, to facilitate determining whether adaptation of the data rate associated with the UE (e.g., output data rate of intelligent adaptation node, input data rate of UE) should be dynamically and automatically triggered, even though the adaptation time interval is not yet completed (e.g., the adaptation time threshold has not been reached). For example, a trigger condition (e.g., a predefined rate adaptation rule relating to dynamic triggering of rate adaptation) can specify, if the volatility of the communication conditions associated with the UE changes (e.g., increases) beyond a predefined threshold amount of change (e.g., percentage of change in volatility of communication conditions, predefined amount of change in volatility of communication conditions) over a predefined period of time (e.g., period of time that is shorter than the adaptation time interval), adaptation of the data rate associated with the UE can be dynamically triggered. As another example, another trigger condition can specify, if the current mode of operation of the application or service used by the UE changes during the adaptation time interval and/or the change in the mode of operation (e.g., change from sleep mode to active mode; change from download of an audio file to a download of a video file to the UE, etc.) results in a change in the desired QoS or bandwidth, the intelligent adaptation controller can dynamically trigger adaptation of the data rate associated with the UE, based at least in part on the predefined rate adaptation criteria.

As yet another example, another trigger condition can specify, if the current application or service used by the UE changes during the adaptation time interval (e.g., change from an application or service which involves sharing video to a different application or service which involves navigation) and thereby results in a change in the desired QoS or bandwidth, the intelligent adaptation controller can dynamically trigger adaptation of the data rate associated with the UE, based at least in part on the predefined rate adaptation criteria. Note also that multiple applications or services can be operating simultaneously, e.g., with a multitasking UE (e.g., smartphone such as the Palm Pre). With simultaneous application or services, the subject innovation can consider each application/service separately (e.g., with each IP session or wireless bearer connection being handled separately) or in an aggregate sense (e.g., obtaining the highest QoS needed from the various sessions or bearers). As yet another example, another trigger condition can specify, for simultaneous applications or services, if the application or service currently being viewed by the UE user changes during the adaptation time interval (e.g., the UE user minimizes one window to maximize and/or view a different window) and thereby results in a change in the desired QoS or bandwidth, the intelligent adaptation controller can dynamically trigger adaptation of the data rate associated with the UE, based at least in part on the predefined rate adaptation criteria. In this case, the determination of which simultaneously operating application or service is currently being viewed can be made directly by the UE or UE operating system, and communicated via signaling to the intelligent adaptation controller. Alternately or additionally, the sessions or bearers associated with the various simultaneously operating applications or services can experience traffic changes (e.g., changes in utilized bandwidth, data rate, headers, ports or protocols, data type/payload information, etc.) detectable via inspection by an inspection component(s), which can determine which simultaneously operating application or service is currently being viewed and can communicate this information to the intelligent adaptation controller.

At 1206, a determination can be made regarding whether adaptation of the data rate associated with the UE is to be dynamically triggered by determining whether a trigger condition(s) has been met, based at least in part on the predefined rate adaptation criteria. If, at 1206, it is determined that the dynamic trigger condition(s) (e.g., corresponding to applicable predefined rate adaptation criteria) for dynamically triggering adaptation of the data rate associated with the UE has not been met, methodology 1200 can proceed to reference numeral 1202, where methodology 1200 can be employed to continue monitoring communication conditions associated with the UE and conditions relating to the use of the application or service by the UE, and methodology 1200 can proceed from that point. If, at 1206, it is determined that the dynamic trigger condition(s) (e.g., corresponding to applicable predefined adaptation criteria) for dynamically triggering adaptation of the data rate associated with the UE has been met, at 1208, adaptation of the data rate associated with the UE can be dynamically triggered to occur. In an aspect, the intelligent adaptation controller can dynamically and automatically trigger adaptation of the data rate associated with the UE when a dynamic trigger condition(s) has been met, and can calculate a new adapted data rate associated with the UE based at least in part on the predefined rate adaptation criteria. For example, the intelligent adaptation controller can adapt the data rate associated with the UE based at least in part on type of application or service, specific application or service and/or current mode of operation of an application or a service used by the UE, and/or expected values of QoS factors and communication condition metrics associated with the UE, such as more fully described herein. As desired, the timer that tracks the time that has elapsed during the adaptation time interval can be re-set to the predefined reset value (e.g., to 0) or can continue to increment (e.g., toward the adaptation time threshold associated with the UE).

Figure 13:
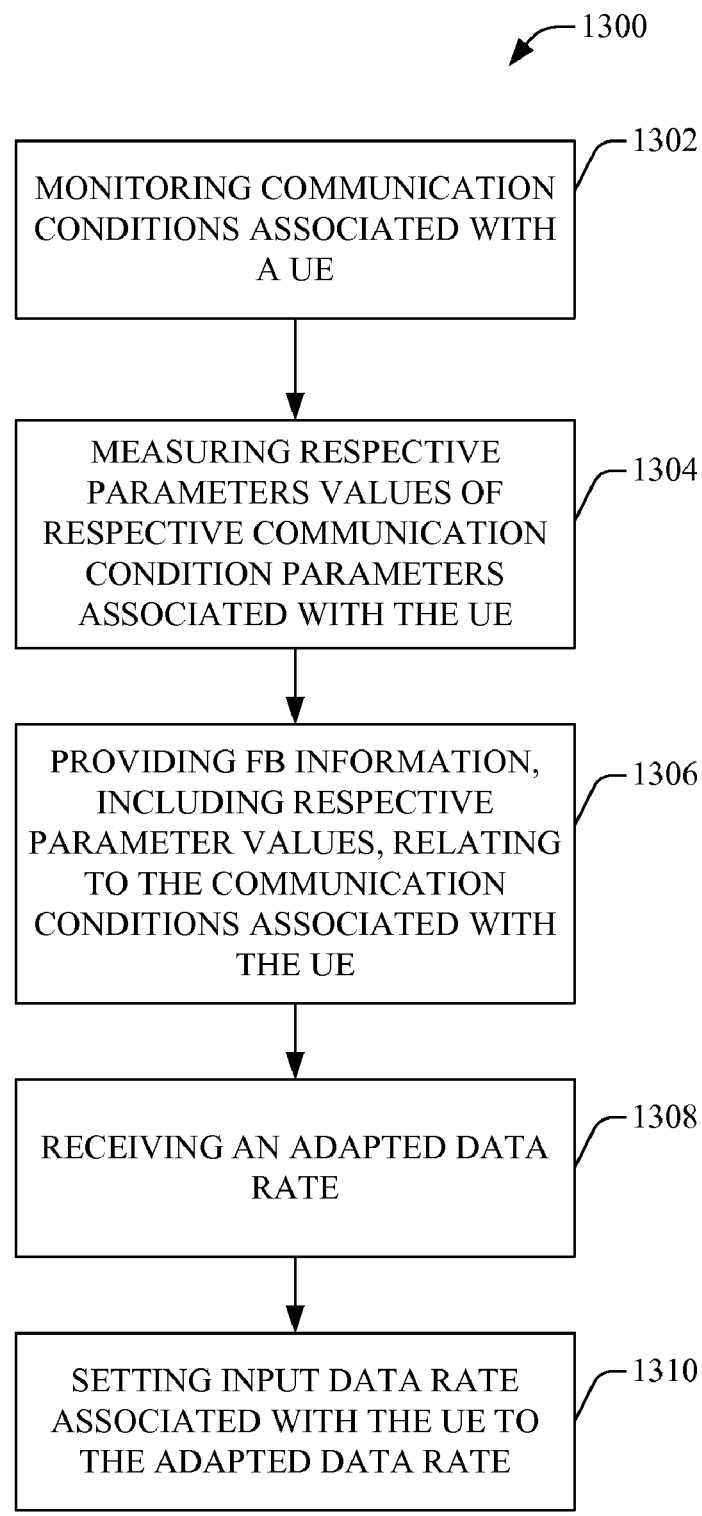
FIG. 13 depicts a flowchart of an example methodology that can provide FB information regarding communication conditions associated with a communication device to facilitate adapting rate codings or data rates associated with the communication device in a communication network in accordance with an aspect of the disclosed subject matter.

FIG. 13 depicts a flowchart of an example methodology 1300 that can provide FB information regarding communication conditions associated with a UE to facilitate adapting rate codings or data rates associated with the UE in a communication network in accordance with an aspect of the disclosed subject matter. At 1302, communication conditions associated with a UE can be monitored. In an aspect, when the UE accesses an application or a service in the communication network, the UE and/or a base station serving the UE can detect or monitor communication conditions (e.g., RF link, bandwidth, QoS, . . . ) associated with the UE.

At 1304, respective parameters values of respective communication condition parameters (e.g., RF metrics) associated with the UE can be measured. In an aspect, the UE and/or serving base station can measure respective parameters values of respective communication condition parameters associated with the UE.

At 1306, FB information, including respective parameter values, relating to the communication conditions associated with the UE can be provided. In an aspect, the serving base station and/or the UE (via the serving base station) can provide FB information relating to the communications associated with the UE to an intelligent adaptation node associated with the serving base station in the communication network, and the FB information can be forwarded to the intelligent adaptation controller by the intelligent adaptation node. The FB information, or at least a portion thereof, can be utilized to facilitate determining and adapting the data rate associated with the UE, and/or determining whether dynamic triggering of adaptation of the data rate is to occur.

At 1308, an adapted data rate associated with the UE can be received. In an aspect, the UE can receive information relating to an adapted data rate (e.g., rate coding information) from the intelligent adaptation controller via the intelligent adaptation node and/or serving base station, where the adapted data rate can be based at least in part on the FB conditions provided by the UE and/or base station at reference numeral 1306. At 1310, the input data rate associated with the UE can be set to the received adapted data rate. In an aspect, the UE can set its input data rate to the adapted data rate received in the information received by the UE from the intelligent adaptation controller.

Figure 14:
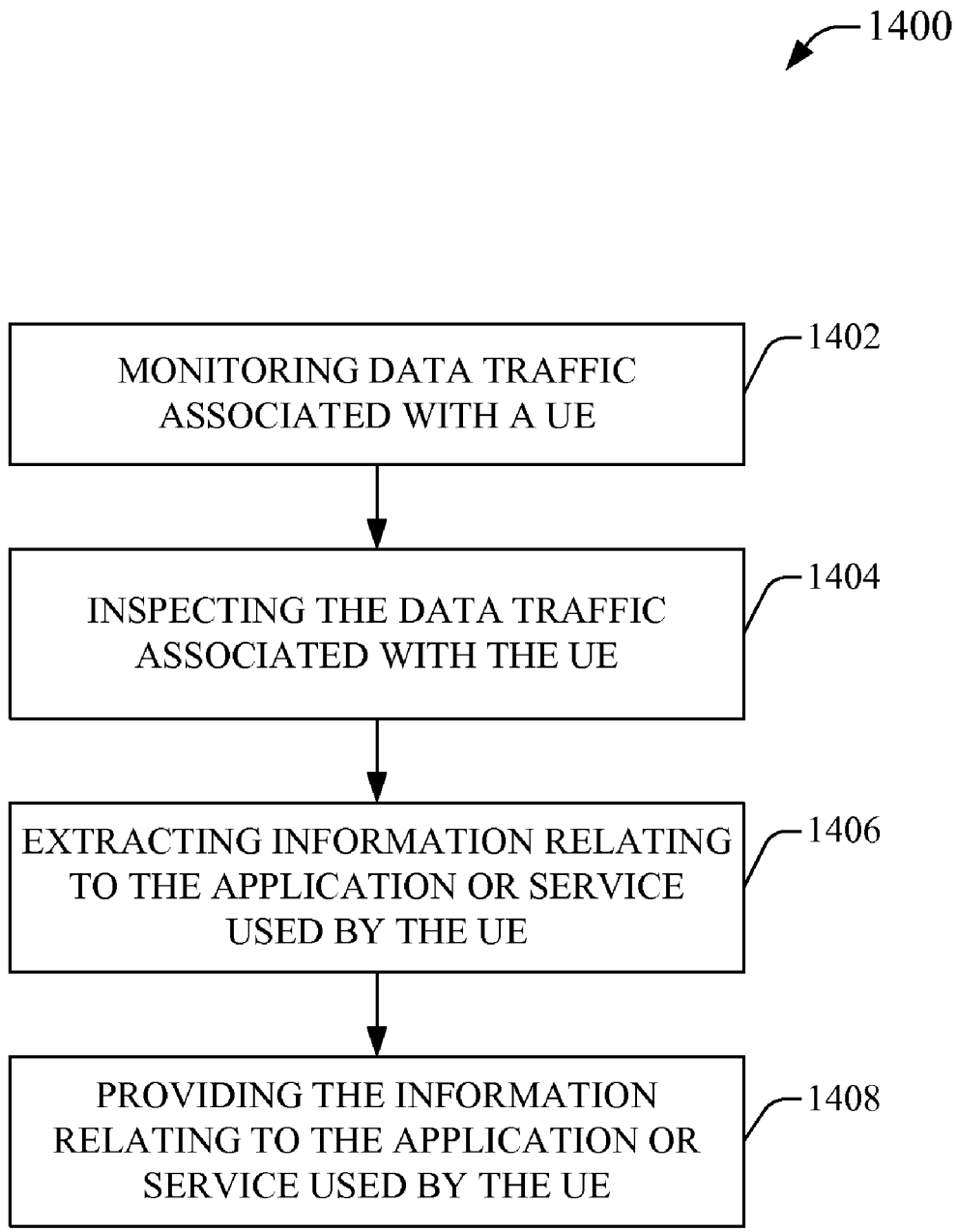
FIG. 14 depicts a flowchart of an example methodology that can inspect data traffic associated with a communication device to obtain information regarding an application or service utilized by the communication device to facilitate adapting rate codings or data rates associated with the communication device in a communication network in accordance with an aspect of the disclosed subject matter.

FIG. 14 depicts a flowchart of an example methodology 1400 that can inspect data traffic associated with a UE to obtain information regarding an application or service utilized by a UE to facilitate adapting rate codings or data rates associated with the UE in a communication network in accordance with an aspect of the disclosed subject matter. At 1402, data traffic associated with a UE can be monitored. In an aspect, one or more inspection components can monitor data traffic associated with a UE when the UE is utilizing an application or service (e.g., downloading data from a data source).

At 1404, the data traffic associated with the UE can be inspected. In one aspect, an inspection component can inspect the data traffic associated with the UE, where the inspection can be DPI of the data traffic, where the header information and data payload of the data traffic can be inspected, or a lower level of inspection, such as inspection of header information of the data traffic. The data traffic can be inspected to facilitate obtaining information regarding the application or service being used by the UE and/or type of data be communicated between the data source and UE, where such information can be utilized to facilitate intelligently determining an adapted data rate to be used for data communications associated with the UE during an adaptation time interval.

At 1406, information relating to the application or service used by the UE can be extracted. In an aspect, the inspection component can extract information relating to the application or service used by the UE and/or other information. For instance, information relating to the type of application or service utilized by the UE, specific application or service utilized by the UE, and/or mode of operation of the application or service utilized by the UE, as well as the type of data (e.g., video data, audio data, textual data, etc.) being communicated, can be extracted from the data traffic associated with the UE. It is to be appreciated that, in accordance with various other embodiments, the inspection component can inspect the data traffic at the desired level of inspection and can provide information obtained from the inspection of the data traffic to the intelligent adaptation controller, which can extract desired information, such as information relating to the application or service used by the UE, from the information provided by the inspection component.

At 1408, the information relating to the application or service used by the UE can be provided, for example, to the intelligent adaptation controller. In an aspect, the inspection component can provide the information relating to the application or service used by the UE to the intelligent adaptation controller. The intelligent adaptation controller can utilize such information, and other information (e.g., predefined rate adaptation rules, current and historical communication conditions associated with the UE, QoS/QoE information, etc.), to facilitate determining an adapted data rate to be used for data communications associated with the UE during an adaptation time interval while using the application or service. In an aspect, the data source and/or UE also can provide information relating to the application or service being used by the UE to the intelligent adaptation controller to facilitate adapting the data rate associated with the UE for a given adaptation time interval.

It is to be appreciated and understood that components (e.g., intelligent adaptation controller, intelligent adaptation node, inspection components, UE, base station, core network, data source, . . . ), as described with regard to a particular system or methodology, can include the same or similar functionality as respective components as described with regard to other systems or methodologies disclosed herein.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," "data storage," "database," and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise, but is not limited to comprising, subscriber information; cell configuration (e.g., devices served by an AP) or service policies and specifications; privacy policies; and so forth. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), phase change memory (PCM), flash memory, or nonvolatile RAM (e.g., ferroelectric RAM (FeRAM). Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD), Blu-ray disc (BD), . . . ), smart cards, and flash memory devices (e.g., card, stick, key drive . . . ).

What has been described above includes examples of systems and methods that provide advantages of the subject innovation. It is, of course, not possible to describe every conceivable combination of components or methodologies for purposes of describing the claimed subject matter, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
an intelligent adaptation controller that determines an adapted data rate associated with a communication device in response to an adaptation of a data rate being initiated, based at least in part on information relating to an application utilized by the communication device and a predefined rate adaptation criterion, to facilitate communication of data between a data source and the communication device; and
an intelligent adaptation node that is associated with the communication device and sets an output data rate to the adapted data rate associated with the communication device and communicates rate coding information to the communication device to facilitate implementation of the adapted data rate by the communication device,
wherein the intelligent adaptation controller obtains information relating to current and historical communication conditions associated with the communication device, information relating to a user of the communication device, and information relating to quality of service in relation to the application used by the communication device, and determines respective expected values for quality of service factors and communication condition metrics associated with the communication device and a volatility margin relating to communication conditions associated with the communication device, based at least in part on the predefined rate adaptation criterion, in response to the adaptation of the data rate being initiated.

2. The system of claim 1, wherein the intelligent adaptation controller determines a preliminary data rate based at least in part on communication conditions associated with the communication device in response to the adaptation of the data rate being initiated, wherein the communication conditions relate to a radio frequency link between the communication device and a base station.

3. The system of claim 2, wherein the intelligent adaptation controller determines an application margin based at least in part on the information relating to the application, and adjusts the preliminary data rate as a function of the application margin to obtain an adjusted preliminary data rate.

4. The system of claim 3, wherein the information relating to the application comprises a type of application.

5. The system of claim 3, wherein the intelligent adaptation controller adjusts the adjusted preliminary data rate as a function of the volatility margin to obtain the adapted data rate.

6. The system of claim 5, wherein the intelligent adaptation controller transmits information relating to the adapted data rate to the intelligent adaptation node to facilitate an output data rate of the intelligent adaptation controller being set to the adapted data rate and an input data rate of the communication device being set to the adapted data rate.

7. The system of claim 1, wherein the intelligent adaptation controller applies a predefined rate adaptation rule that is in accordance with the predefined rate adaptation criterion to facilitate determination of the adapted data rate.

8. The system of claim 1, wherein the intelligent adaptation controller initially sets the data rate associated with the communication device based at least in part on a current communication condition associated with the communication device at a time when the application is being set up.

9. The system of claim 1, wherein the intelligent adaptation controller employs a timer to track an amount of time that has elapsed during an adaptation time interval related to the adaptation of the data rate associated with the communication device, sets an adaptation time threshold to a specified value and sets the timer to a predefined value in response to the application being set up, wherein the adaptation of the data rate is periodically triggered and the timer is reset to the predefined value in response to the adaptation time threshold being reached, and wherein the specified value of the adaptation time threshold is determined based at least in part on a current communication condition associated with the communication device.

10. The system of claim 1, wherein the intelligent adaptation controller dynamically triggers the adaptation of the data rate associated with the communication device during an adaptation time interval, based at least in part on the predefined rate adaptation criterion.

11. The system of claim 10, wherein the communication device includes a mobile phone.

12. The system of claim 1, wherein the predefined rate adaptation criterion relates to a communication condition associated with the communication device.

13. The system of claim 1, wherein the data source includes another communication device.

14. A method, comprising:
determining an adapted data rate associated with a communication device at least at respective ends of adaptation time periods, based at least in part on information relating to an application utilized by the communication device and a predefined rate adaptation criterion, to facilitate communication of data between a data source and the communication device;
transmitting data to the communication device in accordance with the adapted data rate during a next adaptation time period;
determining an initial data rate associated with the communication device based at least in part on feedback information relating to a communication condition associated with the communication device in response to the application being initiated with regard to the communication device;
setting an output data rate of an intelligent adaptation node associated with the communication device in accordance with the initial data rate during an initial adaptation time period;
transmitting rate coding information to the communication device to facilitate setting an input data rate of the communication device in accordance with the initial data rate during the initial adaptation time period;
setting an adaptation time threshold to a predefined value;
setting a timer to a predefined reset value;
operating the timer to proceed from the predefined reset value towards the adaptation time threshold; and
in response to determining the timer reaching the adaptation time threshold, ending the initial adaptation time period and periodically triggering adaptation of the data rate.

15. The method of claim 14, further comprising:
monitoring data traffic associated with the communication device during the respective adaptation time periods;
inspecting the data traffic; and
extracting information relating to the application from the data traffic.

16. The method of claim 15, further comprising:
determining a preliminary data rate based at least in part on feedback information relating to a current communication condition associated with the communication device;
obtaining quality of service information and a predefined rate adaptation rule;
evaluating the extracted information relating to the application;
identifying in relation to the application a type of application, based at least in part on the extracted information;
determining an application margin based at least in part on the quality of service information, the predefined rate adaptation rule, and the type of application; and
adjusting the preliminary data rate as a function of the application margin to obtain an adjusted preliminary data rate.

17. The method of claim 16, further comprising:
obtaining historical communication condition information and information relating to a user, associated with the communication device;

obtaining quality of service information and another predefined rate adaptation rule relating to adjusting the adjusted preliminary data rate;
predicting respective expected values for a quality of service factor and a communication condition metric;
determining a volatility margin based at least in part on the respective expected values for the quality of service factor and the communication conditions metric;
adjusting the adjusted preliminary data rate as a function of the volatility margin to obtain the adapted data rate; and
applying the adapted data rate for communications associated with the communication device during the next adaptation time period.

18. The method of claim 14, further comprising:
setting an output data rate of an intelligent adaptation node associated with the communication device in accordance with the adapted data rate during the next adaptation time period; and
transmitting rate coding information to the communication device to facilitate setting the input data rate of the communication device in accordance with the adapted data rate during the next adaptation time period.

19. The method of claim 14, further comprising:
monitoring communication conditions associated with the communication device;
detecting change in the communication conditions associated with the communication device;
evaluating the change in the communication conditions associated with the communication device;
determining whether the change in the communication conditions associated with the communication satisfies a dynamic trigger condition based at least in part on the predefined rate adaptation criterion; and
dynamically triggering rate adaptation to determine a new adapted data rate to be utilized for data communications associated with the communication device when the trigger condition is satisfied, even when a current adaptation time period has not yet ended.

20. The method of claim 14, further comprising:
controlling a predefined value of an adaptation time threshold associated with the next adaptation time period based at least in part on a current volatility in communication conditions associated with the communication device.

21. The method of claim 14, wherein the predefined rate adaptation criterion relates to the communication condition associated with the communication device.

22. A computer-readable storage medium having instructions stored thereon that, in response to execution by a system including a processor, cause the system to perform operations, comprising:
calculating an adapted data rate associated with a mobile communication device at least at an end of each of adaptation time periods, based at least in part on information relating to a service utilized by the mobile communication device and predefined rate adaptation criterion, to facilitate communicating data between a data source and the mobile communication device;
transmitting data to the mobile communication device in accordance with the adapted data rate during a next adaptation time period;
calculating a service margin based at least in part on the information relating to the service utilized by the mobile communication device and a predefined rate adaptation rule based at least in part on the predefined rate adaptation criterion;
applying the service margin to a preliminary data rate to obtain an adjusted preliminary data rate, wherein the preliminary data rate is determined based at least in part on a current communication condition associated with the mobile communication device at an end of an adaptation time period;
calculating a volatility margin based at least in part on respective expected values of quality of service factors and communication condition metrics, wherein the respective expected values of quality of service factors and communication condition metrics are predicted based at least in part on historical information relating to the communication condition associated with the mobile communication device, information relating to a user of the mobile communication device, quality of service-related information, another predefined rate adaptation rule, and the predefined rate adaptation criterion;
applying the volatility margin to the adjusted preliminary data rate to obtain the adapted data rate; and
utilizing the adapted data rate during a next adaptation time period.

23. An apparatus comprising:
means for determining an adapted data rate associated with a communication device in a communication network in response to triggering of dynamic data rate adaptation, based at least in part on information relating to an application utilized by the communication device, respective expected values of quality of service factors and radio frequency condition metrics associated with the communication device, and a predefined rate adaptation criterion, to facilitate communication of data between a data source and the communication device;
means for obtaining information relating to current and historical communication conditions associated with the communication device, information relating to a user of the communication device, and the information relating to the quality of service factors in relation to the application used by the communication device,
means for calculating the respective expected values for the quality of service factors and the radio frequency condition metrics associated with the communication device and a volatility margin relating to the current and historical communication conditions associated with the communication device, based at least in part on the predefined rate adaptation criterion, in response to the triggering of the dynamic data rate adaptation; and
means for transmitting data to the communication device in accordance with the adapted data rate during a next adaptation time period.

24. A mobile communication device, comprising:
a monitor component that monitors a communication condition associated with the communication device;
a transmitter component that transmits feedback information comprising at least a portion of the communication condition to facilitate a determination of an adapted data rate for a next adaptation time interval at an end of each of a plurality of adaptation time intervals to facilitate communication of data associated with the mobile communication device;
wherein the mobile communication device utilizes information obtained by an intelligent adaptation controller, the information relating to current and historical communication conditions associated with the communication device, to a user of the communication device, and to quality of service in relation to an application used by the mobile communication device, and further utilizes information calculated by the intelligent adaptation controller, the calculated information including respective expected values for quality of service factors and communication condition metrics associated with the mobile communication device and a volatility margin relating to the communication condition associated with the mobile communication device, based at least in part on a predefined rate adaptation criterion, in response to a triggering of adaptation of the data rate.

25. The mobile communication device of claim 24, wherein the communication conditions relate to a radio frequency link between the mobile communication device and a base station.

26. The mobile communication device of claim 24, further comprising:
 a receiver component that receives rate coding information relating to the adapted data rate to be utilized during the next adaptation time interval; and
 a rate set component that sets an input data rate of the mobile communication device to the adapted data rate based at least in part on the rate coding information, to facilitate reception of data relating to the application in accordance with the adapted data rate.

* * * * *